(12) United States Patent
Jeong

(10) Patent No.: US 10,587,814 B2
(45) Date of Patent: Mar. 10, 2020

(54) AUTOMATIC EXPOSURE CONTROL FOR AUDIO/VIDEO RECORDING AND COMMUNICATION DEVICES

(71) Applicant: A9.com, Inc., Palo Alto, CA (US)

(72) Inventor: Changsoo Jeong, Rancho Palos Verdes, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 15/904,214

(22) Filed: Feb. 23, 2018

(65) Prior Publication Data

US 2018/0249059 A1 Aug. 30, 2018

Related U.S. Application Data

(60) Provisional application No. 62/463,685, filed on Feb. 26, 2017.

(51) Int. Cl.
*H04N 5/235* (2006.01)
*H04N 7/18* (2006.01)
(Continued)

(52) U.S. Cl.
CPC ......... *H04N 5/2351* (2013.01); *H04N 5/2352* (2013.01); *H04N 5/2353* (2013.01);
(Continued)

(58) Field of Classification Search
CPC ..... H04N 5/2351; H04N 5/2353; H04N 5/243
(Continued)

(56) References Cited

U.S. PATENT DOCUMENTS

| 4,764,953 A | 8/1988 | Chern et al. |
| 5,428,388 A | 6/1995 | von Bauer et al. |

(Continued)

FOREIGN PATENT DOCUMENTS

| CN | 2585521 Y | 11/2003 |
| CN | 2792061 Y | 6/2006 |

(Continued)

OTHER PUBLICATIONS

Nho, Ji Myong, International Search Report and Written Opinion of the International Searching Authority for PCT/US/2018/019565, dated Jun. 8, 2018, International Application Division, Korean Intellectual Property Office, Republic of Korea.

*Primary Examiner* — Usman A Khan
(74) *Attorney, Agent, or Firm* — Greenberg Traurig, LLP

(57) ABSTRACT

Automatic exposure control for audio/video (A/V) recording and communication devices in accordance with various embodiments of the present disclosure are provided. In one embodiment, an A/V recording and communication device is provided, comprising: a camera configured to capture image data of a foreground object within a field of view of the camera; a communication module; and a processing module comprising: a processor; and a camera application that configures the processor to: detect motion within the field of view that includes an active image region; capture image data of the field of view; detect the foreground object in the active image region and determine an external lighting level associated with the foreground object; determine at least one exposure control gain setting based on the determined external lighting level; and apply the at least one exposure control gain setting to configure the camera to capture image data focused on the foreground object.

20 Claims, 30 Drawing Sheets

(51) Int. Cl.
  *H04N 5/243* (2006.01)
  *H04N 5/232* (2006.01)
  *H04N 5/14* (2006.01)
(52) U.S. Cl.
  CPC ....... *H04N 5/2355* (2013.01); *H04N 5/23219* (2013.01); *H04N 5/243* (2013.01); *H04N 7/186* (2013.01); *H04N 5/144* (2013.01)
(58) Field of Classification Search
  USPC ...................................................... 348/229.1
  See application file for complete search history.

(56) References Cited

U.S. PATENT DOCUMENTS

| | | | |
|---|---|---|---|
| 5,760,848 A | 6/1998 | Cho | |
| 6,072,402 A | 6/2000 | Kniffin et al. | |
| 6,192,257 B1 | 2/2001 | Ray | |
| 6,271,752 B1 | 8/2001 | Vaios | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,633,231 B1 | 10/2003 | Okamoto et al. | |
| 6,658,091 B1 | 12/2003 | Naidoo et al. | |
| 6,753,774 B2 | 6/2004 | Pan et al. | |
| 6,970,183 B1 | 11/2005 | Monroe | |
| 7,062,291 B2 | 6/2006 | Ryley et al. | |
| 7,065,196 B2 | 6/2006 | Lee | |
| 7,085,361 B2 | 8/2006 | Thomas | |
| 7,109,860 B2 | 9/2006 | Wang | |
| 7,193,644 B2 | 3/2007 | Carter | |
| 7,304,572 B2 | 12/2007 | Sheynman et al. | |
| 7,382,249 B2 | 6/2008 | Fancella | |
| 7,450,638 B2 | 11/2008 | Iwamura | |
| 7,643,056 B2 | 1/2010 | Silsby | |
| 7,683,924 B2 | 3/2010 | Oh et al. | |
| 7,683,929 B2 | 3/2010 | Elazar et al. | |
| 7,738,917 B2 | 6/2010 | Ryley et al. | |
| 8,139,098 B2 | 3/2012 | Carter | |
| 8,144,183 B2 | 3/2012 | Carter | |
| 8,154,581 B2 | 4/2012 | Carter | |
| 8,619,136 B2 | 12/2013 | Howarter et al. | |
| 8,872,915 B1 | 5/2014 | Scalisi et al. | |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Scalisi | |
| 9,094,584 B2 | 7/2015 | Scalisi et al. | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi | |
| 9,179,108 B1 | 11/2015 | Scalisi | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,508,239 B1 | 11/2016 | Harrison et al. | |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 2002/0094111 A1 | 7/2002 | Puchek et al. | |
| 2002/0147982 A1 | 10/2002 | Naidoo et al. | |
| 2003/0043047 A1 | 3/2003 | Braun | |
| 2004/0085205 A1 | 5/2004 | Yeh | |
| 2004/0085450 A1 | 5/2004 | Stuart | |
| 2004/0086093 A1 | 5/2004 | Schranz | |
| 2004/0095254 A1 | 5/2004 | Maruszczak | |
| 2004/0135686 A1 | 7/2004 | Parker | |
| 2005/0111660 A1 | 5/2005 | Hosoda | |
| 2006/0010199 A1 | 1/2006 | Brailean et al. | |
| 2006/0022816 A1 | 2/2006 | Yukawa | |
| 2006/0139449 A1 | 6/2006 | Cheng et al. | |
| 2006/0156361 A1 | 7/2006 | Wang et al. | |
| 2007/0008081 A1 | 1/2007 | Tylicki et al. | |
| 2009/0310955 A1* | 12/2009 | Lien ...................... G03B 7/093 396/153 |
| 2010/0225455 A1 | 9/2010 | Claiborne et al. | |
| 2011/0193990 A1* | 8/2011 | Pillman .................. H04N 5/232 348/229.1 |
| 2013/0010120 A1 | 1/2013 | Nnoruka | |
| 2013/0057695 A1 | 3/2013 | Huisking | |
| 2014/0267716 A1 | 9/2014 | Child et al. | |
| 2015/0116489 A1 | 4/2015 | Asano | |
| 2015/0130967 A1* | 5/2015 | Pieper .................. H04N 5/2355 348/239 |
| 2015/0163463 A1 | 6/2015 | Hwang et al. | |
| 2016/0330403 A1* | 11/2016 | Siminoff ............... H04N 5/2257 |

FOREIGN PATENT DOCUMENTS

| | | |
|---|---|---|
| EP | 0944883 A1 | 6/1988 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 2009-008925 A | 1/2009 |
| WO | 1998/39894 A1 | 9/1998 |
| WO | 2001/13638 A1 | 2/2001 |
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |

* cited by examiner

AUTOMATIC EXPOSURE CONTROL FOR AUDIO/VIDEO RECORDING AND COMMUNICATION DEVICES

CROSS-REFERENCE TO RELATED APPLICATION

This application claims priority to provisional application Ser. No. 62/463,685, filed on Feb. 26, 2017, the entire contents of which are hereby incorporated by reference.

TECHNICAL FIELD

The present embodiments relate to audio/video (AN) recording and communication devices, including A/V recording and communication doorbell systems. In particular, the present embodiments relate to improvements in the functionality of A/V recording and communication devices that enhance the streaming and storing of video recorded by such devices.

BACKGROUND

Home safety is a concern for many homeowners and renters. Those seeking to protect or monitor their homes often wish to have video and audio communications with visitors, for example, those visiting an external door or entryway. Audio/Video (A/V) recording and communication doorbell systems provide this functionality, and can also aid in crime detection and prevention. For example, audio and/or video captured by an A/V recording and communication doorbell can be uploaded to the cloud and recorded on a remote server. Subsequent review of the A/V footage can aid law enforcement in capturing perpetrators of home burglaries and other crimes. Further, the presence of an A/V recording and communication doorbell at the entrance to a home acts as a powerful deterrent against would-be burglars.

SUMMARY

The various embodiments of the present automatic exposure control for audio/video recording and communication devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that in current audio/video (A/V) recording and communication devices (e.g., doorbells) other than the present embodiments, automatic exposure controls cannot handle multi-exposure image conditions. For example, if a field of view of a camera includes a darker region and a brighter region, exposure controls cannot handle more than one part of the scene or simply the average luminance of the entire scene. With A/V recording and communication devices, multi-exposure image conditions may be a particular problem as many A/V recording and communication devices are placed at a structure's entrance that may be covered, thereby requiring the A/V recording and communication device to capture image data of a region shaded by the covering (i.e. darker region) and a region beyond the covering (i.e. brighter region). In another scenario, the A/V recording and communication device may be positioned near an external light source, such as a porchlight, which can create relatively bright areas and relatively dark areas. In these types of lighting conditions, if exposure range is simply increased, the darker region(s) may become brighter but the brighter region(s) may become saturated and washed out, reducing image quality. On the other hand, if exposure range is simply decreased, the brighter region(s) may become darker but the darker region(s) may become even darker, reducing image quality. Further, in current A/V recording and communication devices other than the present embodiments, default exposure controls tend to focus on a center region of the field of view, usually setting exposure controls for bright daylight and focusing less on the boundary areas of a scene. However, it may be more important for A/V recording and communication devices to set exposure controls to capture higher quality image data of a particular person or object than of the entire scene. The present embodiments solve these problems by applying exposure settings based on motion detection and scene conditions. In some embodiments, the A/V recording and communication device may detect a foreground object, determine an external lighting level associated with the foreground object, and apply at least one exposure control gain setting to configure a camera to capture image data focused on the foreground object. In some embodiments, the A/V recording and communication device may detect a multi-exposure condition and apply at least one dynamic resolution (DR) setting to configure the camera to capture image data corrected for the multi-exposure image condition. These and other aspects and advantages of the present embodiments are described in further detail below.

In a first aspect, an audio/video (A/V) recording and communication device is provided, comprising a camera configured to capture image data of a foreground object within a field of view of the camera; a communication module; and a processing module operatively connected to the camera and to the communication module, the processing module comprising: a processor; and a camera application, wherein the camera application configures the processor to: detect motion within the field of view of the camera, wherein the field of view includes an active image region; capture image data of the field of view, including the active image region, using the camera; detect the foreground object in the active image region of the field of view and determine an external lighting level associated with the foreground object; determine at least one exposure control gain setting based on the determined external lighting level; and apply the at least one exposure control gain setting to configure the camera to capture image data focused on the foreground object.

An embodiment of the first aspect further comprises a motion sensor configured to detect the motion within the field of view of the camera.

In another embodiment of the first aspect, the camera application further configures the processor to detect the motion within the field of view of the camera using the camera.

In another embodiment of the first aspect, the camera application further configures the processor to track the foreground object within the field of view using the camera.

In another embodiment of the first aspect, the camera application further configures the processor to determine the external lighting level associated with the foreground object using the image data captured using the camera.

In another embodiment of the first aspect, the at least one exposure control gain setting includes an aperture setting.

In another embodiment of the first aspect, the at least one exposure control gain setting includes a shutter speed setting.

In another embodiment of the first aspect, the at least one exposure control gain setting includes an ISO (International Organization of Standardization) setting.

In another embodiment of the first aspect, the camera application further configures the processor to determine the at least one exposure control gain setting by comparing the determined external lighting level to a predetermined range of external lighting levels.

In another embodiment of the first aspect, the image data focused on the foreground object includes at least one frame that includes the foreground object in a higher image quality than found in the image data captured using the camera before applying the at least one auto-exposure setting.

In a second aspect, a method for an audio/video (A/V) recording and communication device is provided, the audio/video (A/V) recording and communication device comprising a camera, a communication module, and a processing module operatively connected to the camera and to the communication module, the method comprising: detecting motion within a field of view of the camera, wherein the field of view includes an active image region and includes a multi-exposure image condition where the field of view includes a first portion having a first external lighting level and a second portion having a second external lighting level; capturing image data of the field of view, including the active image region, using the camera; detecting a foreground object in the active image region of the field of view and determining an external lighting level associated with the foreground object; determining at least one exposure control gain setting based on the determined external lighting level; and applying the at least one exposure control gain setting to configure the camera to capture image data focused on the foreground object.

In an embodiment of the second aspect, the A/V recoding and communication device further comprises a motion sensor configured to detect the motion within the field of view of the camera.

Another embodiment of the second aspect further comprises detecting the motion within the field of view of the camera using the camera.

Another embodiment of the second aspect further comprises tracking the foreground object within the field of view using the camera.

Another embodiment of the second aspect further comprises determining the external lighting level associated with the foreground object using the image data captured using the camera.

In another embodiment of the second aspect, the at least one exposure control gain setting includes an aperture setting.

In another embodiment of the second aspect, the at least one exposure control gain setting includes a shutter speed setting.

In another embodiment of the second aspect, the at least one exposure control gain setting includes an ISO (International Organization of Standardization) setting.

Another embodiment of the second aspect further comprises determining the at least one exposure control gain setting by comparing the determined external lighting level to a predetermined range of external lighting levels.

In another embodiment of the second aspect, the image data focused on the foreground object includes at least one frame that includes the foreground object in a higher image quality than found in the image data captured using the camera before applying the at least one auto-exposure setting.

In a third aspect, an audio/video (A/V) recording and communication device is provided, comprising a camera configured to capture image data of an object within a field of view of the camera; a communication module; and a processing module operatively connected to the camera and to the communication module, the processing module comprising: a processor; and a camera application, wherein the camera application configures the processor to: detect motion within the field of view of the camera; capture test image data of the field of view using the camera; detect a multi-exposure image condition associated with the test image data captured using the camera; and apply at least one dynamic resolution (DR) setting to configure the camera to capture corrected image data corrected for the multi-exposure image condition.

An embodiment of the third aspect further comprises a motion sensor configured to detect the motion within the field of view of the camera.

In another embodiment of the third aspect, the camera application further configures the processor to detect the motion within the field of view of the camera using the camera.

In another embodiment of the third aspect, the camera application further configures the processor to select a test frame from the test image data and detect the multi-exposure image condition by determining a pixel distribution value associated with the test frame.

In another embodiment of the third aspect, the camera application further configures the processor to apply the at least one DR setting to configure the camera to capture the corrected image data corrected for the multi-exposure image condition if the pixel distribution value is less than a predetermined pixel distribution threshold.

In another embodiment of the third aspect, applying the at least one DR setting configures the camera to capture image data having a first frame with a first exposure range and a second frame with a second exposure range, wherein the second exposure range does not overlap with the first exposure range.

In another embodiment of the third aspect, the camera application further configures the processor to combine the first frame with the first exposure range and the second frame with the second exposure range to generate a single high-dynamic-range (HDR) frame.

In another embodiment of the third aspect, the camera application further configures the processor to select a corresponding motion area in the first frame and the second frame to exclude when generating the single HDR frame.

In another embodiment of the third aspect, applying the at least one DR setting configures the camera to capture image data having a reference frame with a single exposure range.

In another embodiment of the third aspect, the camera application further configures the processor to calculate an average luminance level and a saturated pixel count corresponding to a number of saturated pixels associated with the reference frame.

In another embodiment of the third aspect, the camera application further configures the processor to determine a wide-dynamic-range (WDR) gain setting if the average luminance level is less than a predetermined luminance threshold and the saturated pixel count is more than a predetermined saturated pixels threshold.

In another embodiment of the third aspect, the camera application further configures the processor to apply the wide-dynamic-range (WDR) gain setting to configure the camera to capture WDR image data.

In another embodiment of the third aspect, the camera application further configures the processor to apply a temporal noise removal filter if the WDR image data has a background noise level above a predetermined noise threshold.

In another embodiment of the third aspect, the camera application further configures the processor to reduce the temporal noise filter gain strength if the WDR image data has a motion artifact level above a predetermined artifact threshold.

In another embodiment of the third aspect, the camera application further configures the processor to increase the temporal noise filter gain strength if the WDR image data has a motion artifact level below a predetermined artifact threshold.

In a fourth aspect, a method for an audio/video (A/V) recording and communication device is provided, the audio/video (A/V) recording and communication device comprising a camera, a communication module, and a processing module operatively connected to the camera and to the communication module, the method comprising: detecting motion within a field of view of the camera wherein the field of view includes a multi-exposure image condition that includes a first portion having a first external lighting level and a second portion having a second external lighting level; capturing test image data of the field of view using the camera; detecting the multi-exposure image condition associated with the image data captured using the camera; and applying at least one dynamic resolution (DR) setting to configure the camera to capture corrected image data corrected for the multi-exposure image condition.

In an embodiment of the fourth aspect, the camera further comprises a motion sensor configured to detect the motion within the field of view of the camera.

Another embodiment of the fourth aspect further comprises detecting the motion within the field of view of the camera using the camera.

Another embodiment of the fourth aspect further comprises selecting a test frame from the test image data and detecting the multi-exposure image condition by determining a pixel distribution value associated with the test frame.

Another embodiment of the fourth aspect further comprises applying the at least one DR setting to configure the camera to capture the corrected image data corrected for the multi-exposure image condition if the pixel distribution value is less than a predetermined pixel distribution threshold.

In another embodiment of the fourth aspect, applying the at least one DR setting configures the camera to capture image data having a first frame with a first exposure range and a second frame with a second exposure range, wherein the second exposure range does not overlap with the first exposure range.

Another embodiment of the fourth aspect further comprises combining the first frame with the first exposure range and the second frame with the second exposure range to generate a single high-dynamic-range (HDR) frame.

Another embodiment of the fourth aspect further comprises selecting a corresponding motion area in the first frame and the second frame to exclude when generating the single HDR frame.

In another embodiment of the fourth aspect, applying the at least one DR setting configures the camera to capture image data having a reference frame with a single exposure range.

Another embodiment of the fourth aspect further comprises calculating an average luminance level and a saturated pixel count corresponding to a number of saturated pixels associated with the reference frame.

Another embodiment of the fourth aspect further comprises determining a wide-dynamic-range (WDR) gain setting if the average luminance level is less than a predetermined luminance threshold and the saturated pixel count is more than a predetermined saturated pixels threshold.

Another embodiment of the fourth aspect further comprises applying the wide-dynamic-range (WDR) gain setting to configure the camera to capture WDR image data.

Another embodiment of the fourth aspect further comprises applying a temporal noise removal filter if the WDR image data has a background noise level above a predetermined noise threshold.

Another embodiment of the fourth aspect further comprises reducing the temporal noise filter gain strength if the WDR image data has a motion artifact level above a predetermined artifact threshold.

Another embodiment of the fourth aspect further comprises increasing the temporal noise filter gain strength if the WDR image data has a motion artifact level below a predetermined artifact threshold.

BRIEF DESCRIPTION OF THE DRAWINGS

The various embodiments of the present automatic exposure control for audio/video recording and communication devices now will be discussed in detail with an emphasis on highlighting the advantageous features. These embodiments depict the novel and non-obvious automatic exposure control for audio/video recording and communication devices shown in the accompanying drawings, which are for illustrative purposes only. These drawings include the following figures, in which like numerals indicate like parts:

FIGS. 27, 27-1, and 27-2 are flowcharts illustrating an embodiment of a process for capturing image data corrected for a multi-exposure image condition according to various aspects of the present disclosure;

DETAILED DESCRIPTION

Figure 1:
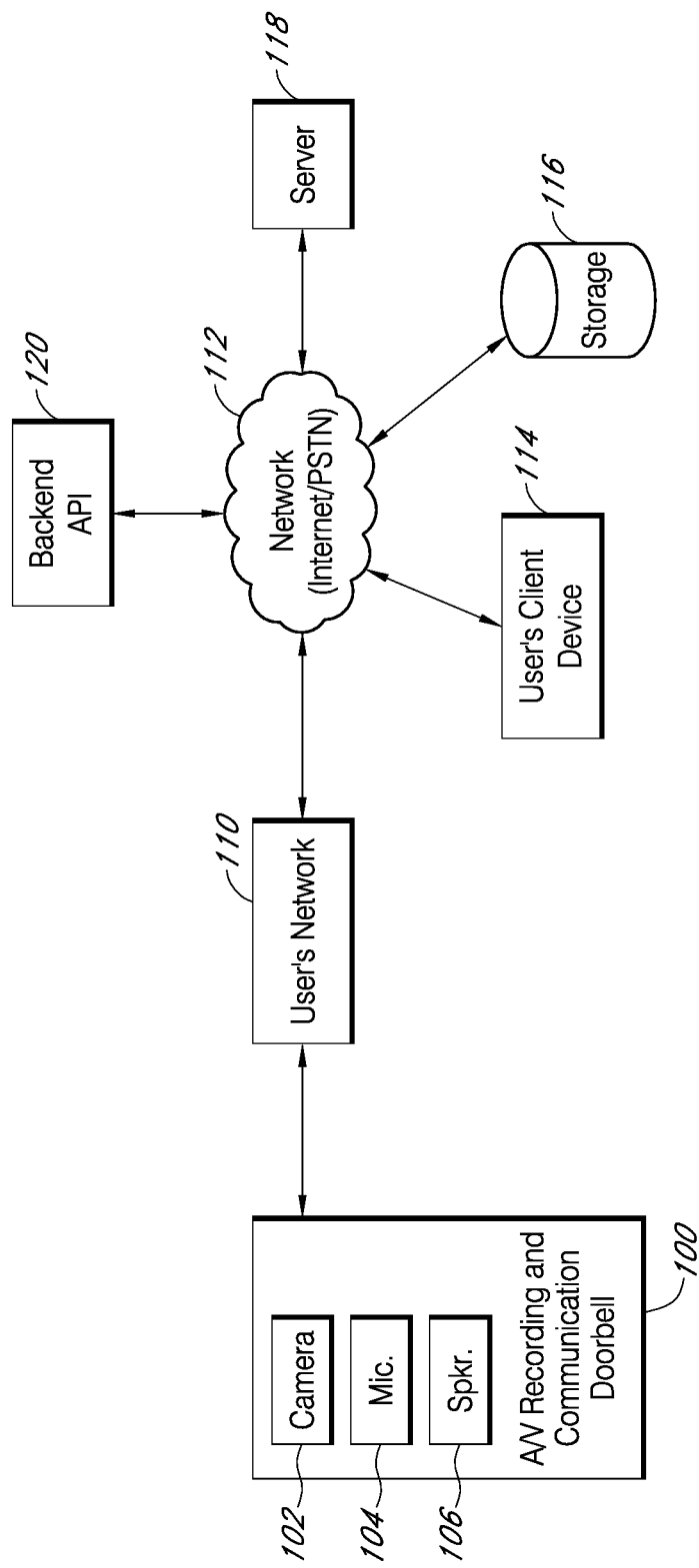
FIG. 1 is a functional block diagram illustrating one embodiment of an A/V recording and communication doorbell system according to the present embodiments.

The following detailed description describes the present embodiments with reference to the drawings. In the drawings, reference numbers label elements of the present embodiments. These reference numbers are reproduced below in connection with the discussion of the corresponding drawing features.

The embodiments of the present streaming and storing video for audio/video recording and communication devices are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein, the term integral describes a single unitary piece.

With reference to FIG. 1, the present embodiments include an audio/video (A/V) recording and communication doorbell 100. The A/V recording and communication doorbell 100 is typically located near the entrance to a structure (not shown), such as a dwelling, a business, a storage facility, etc. The A/V recording and communication doorbell 100 includes a camera 102, a microphone 104, and a speaker 106. The camera 102 may comprise, for example, a high definition (HD) video camera, such as one capable of capturing video images at an image display resolution of 720p or better. While not shown, the A/V recording and communication doorbell 100 may also include other hardware and/or components, such as a housing, one or more motion sensors (and/or other types of sensors), a button, etc. The A/V recording and communication doorbell 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be, for example, a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication doorbell 100 may communicate with a user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication and/or computing device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication doorbell 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE, Cat-"X" (e.g., LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GNSS (global navigation satellite system, e.g., GPS (Global Positioning System)), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication doorbell 100, the A/V recording and communication doorbell 100 detects the visitor's presence and begins capturing video images within a field of view of the camera 102. The A/V recording and communication doorbell 100 may also capture audio through the microphone 104. The A/V recording and communication doorbell 100 may detect the visitor's presence by detecting motion using the camera 102 and/or a motion sensor, and/or by detecting that the visitor has depressed the button on the A/V recording and communication doorbell 100.

In response to the detection of the visitor, the A/V recording and communication doorbell 100 sends an alert to the user's client device 114 (FIG. 1) via the user's network 110 and the network 112. The A/V recording and communication doorbell 100 also sends streaming video, and may also send streaming audio, to the user's client device 114. If the user answers the alert, two-way audio communication may then occur between the visitor and the user through the A/V recording and communication doorbell 100 and the user's client device 114. The user may view the visitor throughout the duration of the call, but the visitor cannot see the user (unless the A/V recording and communication doorbell 100 includes a display, which it may in some embodiments).

The video images captured by the camera 102 of the A/V recording and communication doorbell 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g., a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have a very limited state.

The backend API 120 illustrated in FIG. 1 may include one or more APIs. An API is a set of routines, protocols, and tools for building software and applications. An API expresses a software component in terms of its operations, inputs, outputs, and underlying types, and defines functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
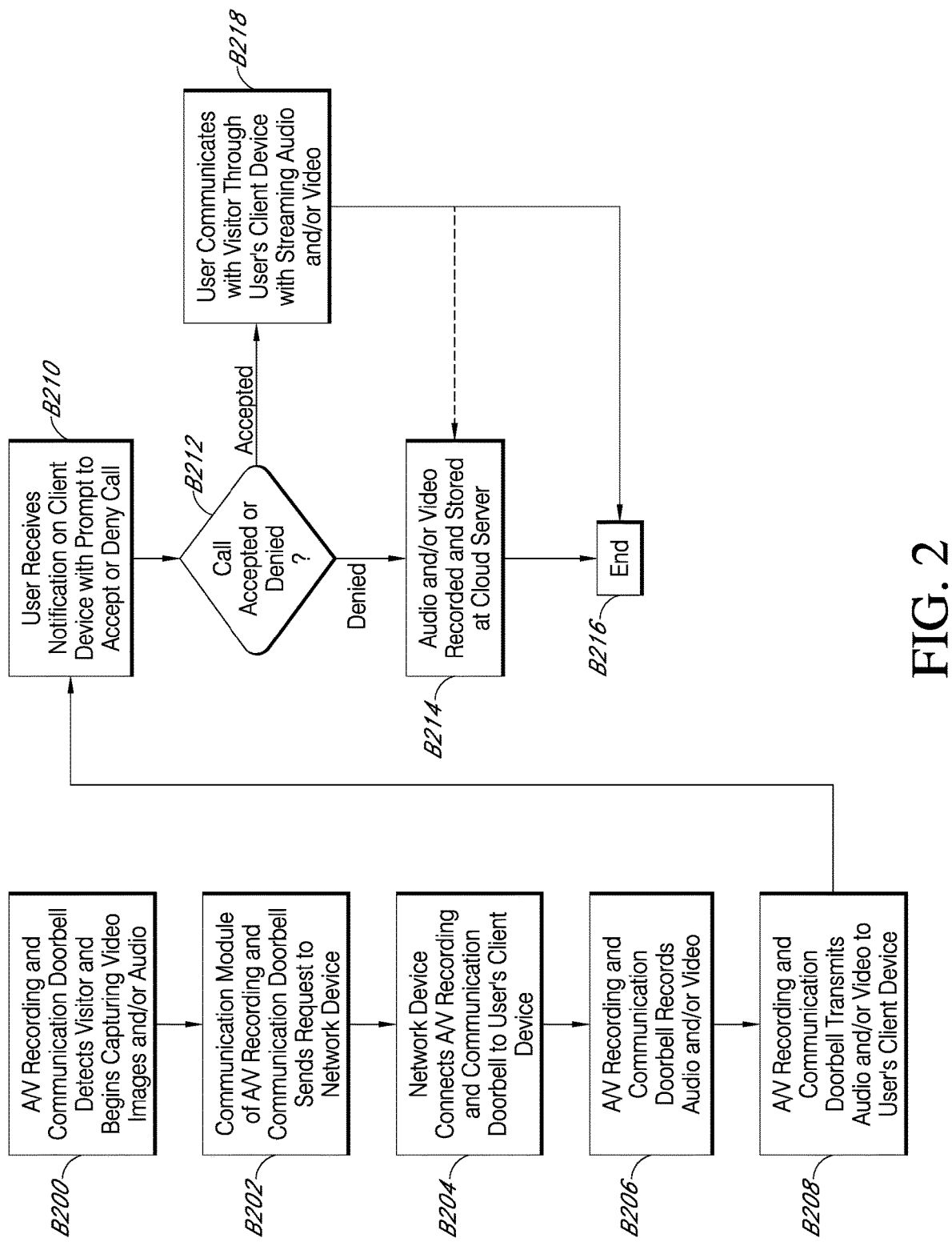
FIG. 2 is a flowchart illustrating one embodiment of a process for streaming and storing A/V content from an A/V recording and communication doorbell system according to various aspects of the present disclosure.

FIG. 2 is a flowchart illustrating a process for streaming and storing A/V content from an A/V recording and communication doorbell system according to various aspects of the present disclosure. At block B200, the A/V recording and communication doorbell 100 detects the visitor's presence and begins capturing video images within a field of view of the camera 102. The A/V recording and communication doorbell 100 may also capture audio through the microphone 104. As described above, the A/V recording and communication doorbell 100 may detect the visitor's presence by detecting motion using the camera 102 and/or a motion sensor, and/or by detecting that the visitor has depressed the button on the A/V recording and communication doorbell 100.

At block B202, a communication module of the A/V recording and communication doorbell 100 sends a connection request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

In response to the request, at block B204 the network device may connect the A/V recording and communication doorbell 100 to the user's client device 114 through the user's network 110 and the network 112. At block B206, the A/V recording and communication doorbell 100 may record available audio and/or video data using the camera 102, the microphone 104, and/or any other sensor available. At block B208, the audio and/or video data is transmitted (streamed) from the A/V recording and communication doorbell 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication doorbell 100 and the user's client device 114 is terminated. If, however, the user accepts the notification, then at block B218 the user communicates with the visitor through the user's client device 114 while audio and/or video data captured by the camera 102, the microphone 104, and/or other sensors is streamed to the user's client device 114. At the end of the call, the user may terminate the connection between the user's client device 114 and the A/V recording and communication doorbell 100 and the session ends at block B216. In some embodiments, the audio and/or video data may be recorded and stored at a cloud server (block B214) even if the user accepts the notification and communicates with the visitor through the user's client device 114.

Many of today's homes include a wired doorbell system that does not have A/V communication capabilities. Instead, standard wired doorbell systems include a button outside the home next to the front door. The button activates a signaling device (such as a bell or a buzzer) inside the building. Pressing the doorbell button momentarily closes the doorbell circuit, which may be, for example, a single-pole, single-throw (SPST) push button switch. One terminal of the button is wired to a terminal on a transformer. The transformer steps down the 120-volt or 240-volt household AC electrical power to a lower voltage, typically 16 to 24 volts. Another terminal on the transformer is wired to a terminal on the signaling device. Another terminal on the signaling device is wired to the other terminal on the button. A common signaling device includes two flat metal bar resonators, which are struck by plungers operated by two solenoids. The flat bars are tuned to different notes. When the doorbell button is pressed, the first solenoid's plunger strikes one of the bars, and when the button is released, a spring on the plunger pushes the plunger up, causing it to strike the other bar, creating a two-tone sound ("ding-dong").

Many current A/V recording and communication doorbell systems (other than the present embodiments) are incompatible with existing wired doorbell systems of the type described in the preceding paragraph. One reason for this incompatibility is that the A/V recording and communication doorbell draws an amount of power from the household AC electrical power supply that is above the threshold necessary for causing the signaling device to sound. The A/V recording and communication doorbell thus causes frequent inadvertent sounding of the signaling device, which is not only bothersome to the home's occupant(s), but also undermines the usefulness of the doorbell. The present embodiments solve this problem by limiting the power consumption of the A/V recording and communication doorbell to an amount that is below the threshold necessary for causing the signaling device to sound. Embodiments of the present A/V recording and communication doorbell can thus be connected to the existing household AC power supply and the existing signaling device without causing inadvertent sounding of the signaling device.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some embodiments, about 10-15 seconds of recorded footage can be continuously stored in the rolling buffer or sliding window. Also because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact. Also because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V recording and communication doorbell and enabling the doorbell to be made even more compact.

Figure 3:
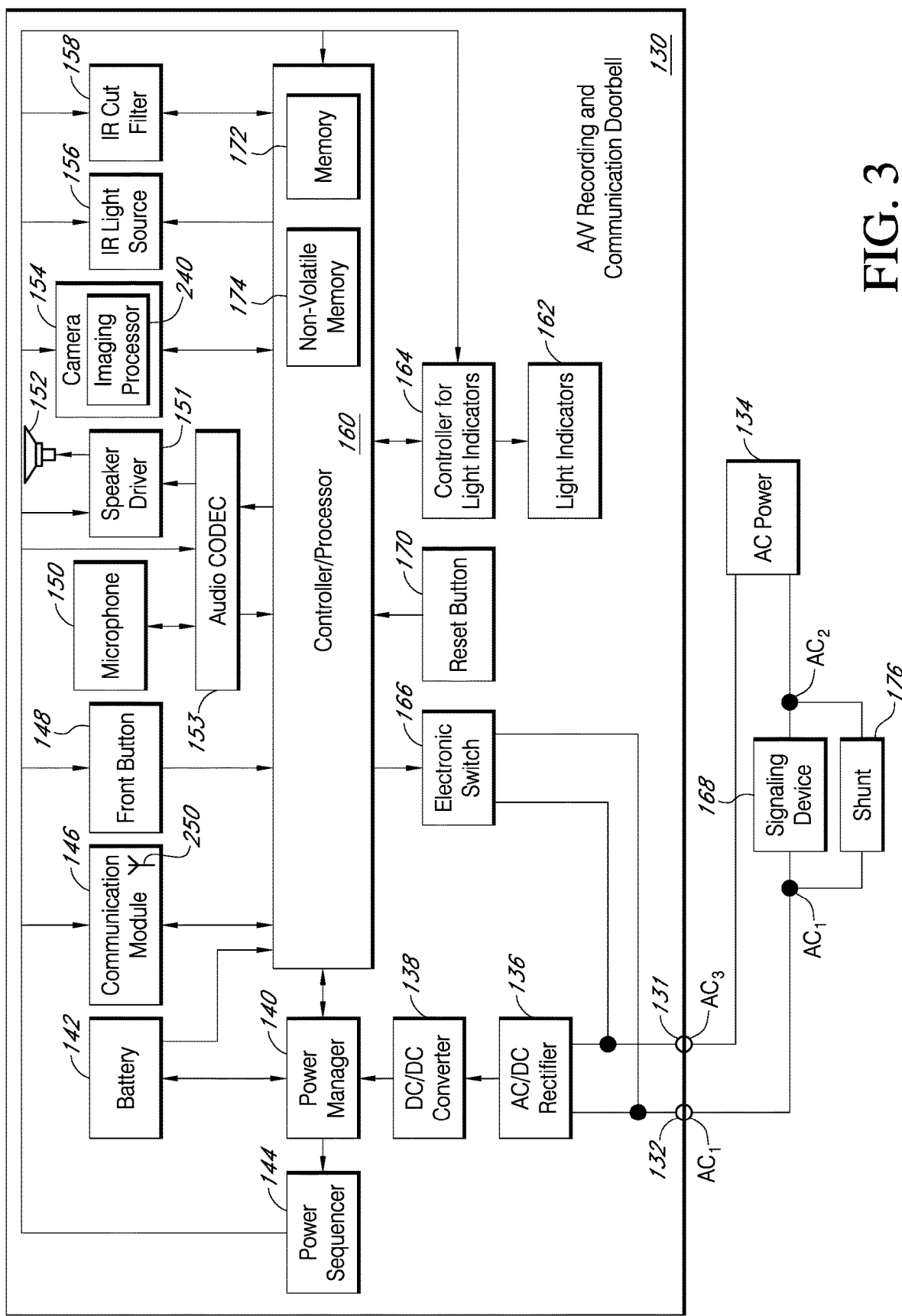
FIG. 3 is a functional block diagram illustrating an embodiment of an A/V recording and communication doorbell system according to the present disclosure.

FIGS. 3-13 illustrate one embodiment of a low-power-consumption A/V recording and communication doorbell 130 according to various aspects of the present disclosure. FIG. 3 is a functional block diagram illustrating various components of the A/V recording and communication doorbell 130 and their relationships to one another. For example, the A/V recording and communication doorbell 130 includes a pair of terminals 131, 132 configured to be connected to a source of external AC (alternating-current) power, such as a household AC power supply 134 (may also be referred to as AC mains). The AC power 134 may have a voltage in the range of 16-24 VAC, for example. The incoming AC power 134 may be converted to DC (direct-current) by an AC/DC rectifier 136. An output of the AC/DC rectifier 136 may be connected to an input of a DC/DC converter 138, which may step down the voltage from the output of the AC/DC rectifier 136 from 16-24 VDC to a lower voltage of about 5 VDC, for example. In various embodiments, the output of the DC/DC converter 138 may be in a range of from about 2.5 V to about 7.5 V, for example.

With further reference to FIG. 3, the output of the DC/DC converter 138 is connected to a power manager 140, which may comprise an integrated circuit including a processor core, memory, and/or programmable input/output peripherals. In one non-limiting example, the power manager 140 may be an off-the-shelf component, such as the BQ24773 chip manufactured by Texas Instruments. As described in detail below, the power manager 140 controls, among other things, an amount of power drawn from the external power supply 134, as well as an amount of supplemental power drawn from a battery 142, to power the A/V recording and communication doorbell 130. The power manager 140 may, for example, limit the amount of power drawn from the external power supply 134 so that a threshold power draw is not exceeded. In one non-limiting example, the threshold power, as measured at the output of the DC/DC converter 138, may be equal to 1.4 A. The power manager 140 may also control an amount of power drawn from the external power supply 134 and directed to the battery 142 for recharging of the battery 142. An output of the power manager 140 is connected to a power sequencer 144, which controls a sequence of power delivery to other components of the A/V recording and communication doorbell 130, including a communication module 146, a front button 148, a microphone 150, a speaker driver 151, a speaker 152, an audio CODEC (Coder-DECoder) 153, a camera 154, an infrared (IR) light source 156, an IR cut filter 158, a processor 160 (may also be referred to as a controller 160), a plurality of light indicators 162, and a controller 164 for the light indicators 162. Each of these components is described in detail below. The power sequencer 144 may comprise an integrated circuit including a processor core, memory, and/or programmable input/output peripherals. In one non-limiting example, the power sequencer 144 may be an off-the-shelf component, such as the RT5024 chip manufactured by Richtek.

With further reference to FIG. 3, the A/V recording and communication doorbell 130 further comprises an electronic switch 166 that closes when the front button 148 is depressed. When the electronic switch 166 closes, power from the AC power source 134 is diverted through a signaling device 168 that is external to the A/V recording and communication doorbell 130 to cause the signaling device 168 to emit a sound, as further described below. In one non-limiting example, the electronic switch 166 may be a triac device. The A/V recording and communication doorbell 130 further comprises a reset button 170 configured to initiate a hard reset of the processor 160, as further described below.

With further reference to FIG. 3, the processor 160 may perform data processing and various other functions, as described below. The processor 160 may comprise an integrated circuit including a processor core, memory 172, non-volatile memory 174, and/or programmable input/output peripherals (not shown). The memory 172 may comprise, for example, DDR3 (double data rate type three synchronous dynamic random-access memory). The non-volatile memory 174 may comprise, for example, NAND flash memory. In the embodiment illustrated in FIG. 3, the memory 172 and the non-volatile memory 174 are illustrated within the box representing the processor 160. It is to be understood that the embodiment illustrated in FIG. 3 is merely an example, and in some embodiments the memory 172 and/or the non-volatile memory 174 are not necessarily physically incorporated with the processor 160. The memory 172 and/or the non-volatile memory 174, regardless of their physical location, may be shared by one or more other components (in addition to the processor 160) of the present A/V recording and communication doorbell 130.

The transfer of digital audio between the user and a visitor may be compressed and decompressed using the audio CODEC 153, which is operatively coupled to the processor 160. When the visitor speaks, audio from the visitor is compressed by the audio CODEC 153, digital audio data is sent through the communication module 146 to the network 112 via the user's network 110, routed by the server 118 and delivered to the user's client device 114. When the user speaks, after being transferred through the network 112, the user's network 110, and the communication module 146, the digital audio data is decompressed by the audio CODEC 153 and emitted to the visitor through the speaker 152, which is driven by the speaker driver 151.

With further reference to FIG. 3, some of the present embodiments may include a shunt 176 connected in parallel with the signaling device 168. The shunt 176 facilitates the ability of the A/V recording and communication doorbell 130 to draw power from the AC power source 134 without inadvertently triggering the signaling device 168. The shunt 176, during normal standby operation, presents a relatively low electrical impedance, such as a few ohms, across the terminals of the signaling device 168. Most of the current drawn by the A/V recording and communication doorbell 130, therefore, flows through the shunt 176, and not through the signaling device 168. The shunt 176, however, contains electronic circuitry (described below) that switches the shunt 176 between a state of low impedance, such as a few ohms, for example, and a state of high impedance, such as >1K ohms, for example. When the front button 148 of the A/V recording and communication doorbell 130 is pressed, the electronic switch 166 closes, causing the voltage from the AC power source 134 to be impressed mostly across the shunt 176 and the signaling device 168 in parallel, while a small amount of voltage, such as about 1V, is impressed across the electronic switch 166. The circuitry in the shunt 176 senses this voltage, and switches the shunt 176 to the high impedance state, so that power from the AC power source 134 is diverted through the signaling device 168. The diverted AC power 134 is above the threshold necessary to cause the signaling device 168 to emit a sound. Pressing the front button 148 of the doorbell 130 therefore causes the signaling device 168 to "ring," alerting any person(s) within the structure to which the doorbell 130 is mounted that there is a visitor at the front door (or at another location corresponding to the location of the doorbell 130). In one non-limiting example, the electronic switch 166 may be a triac device.

Figure 4:
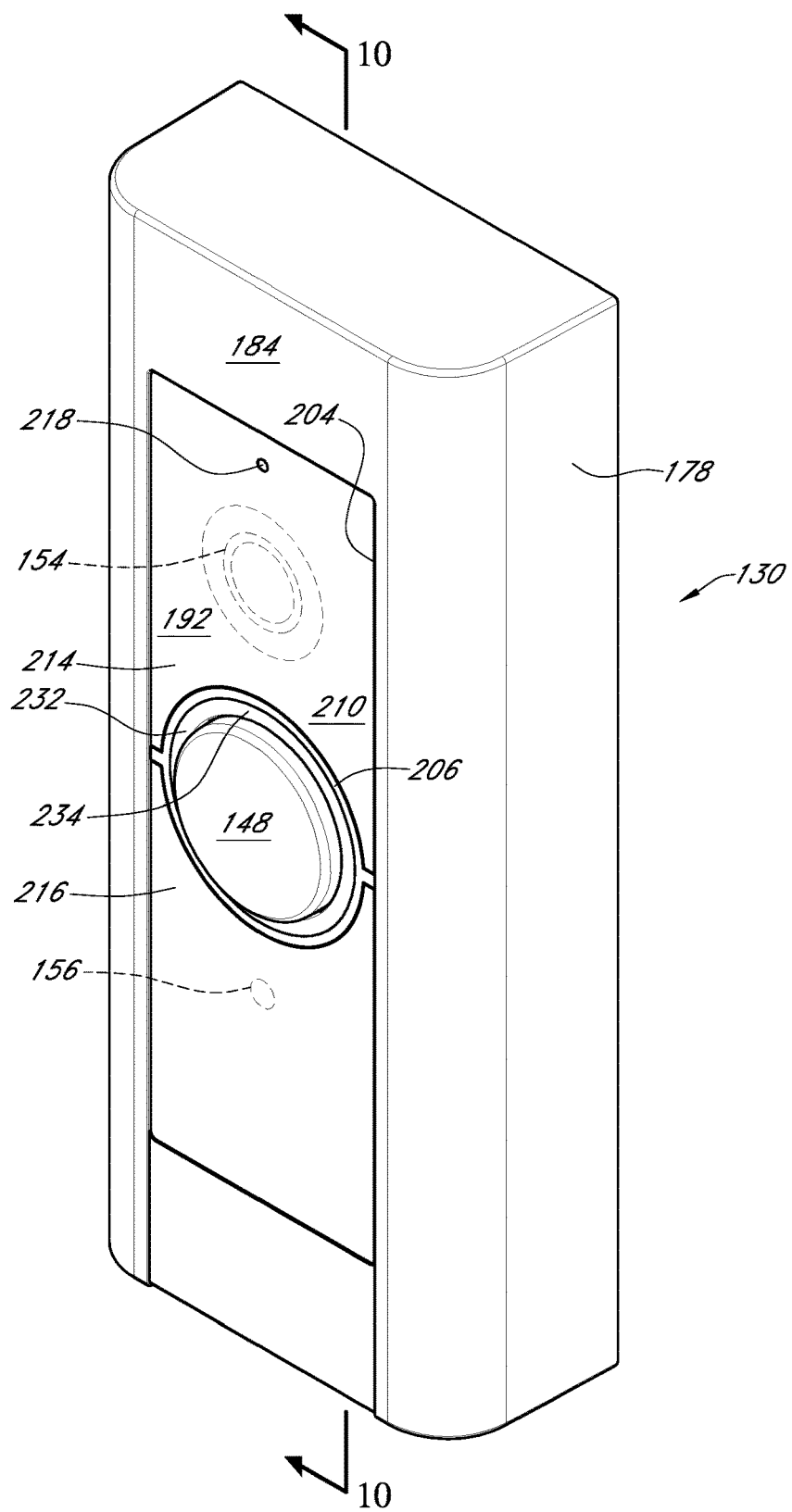
FIG. 4 is a front perspective view of an embodiment of an A/V recording and communication doorbell according to the present disclosure.
Figure 5:
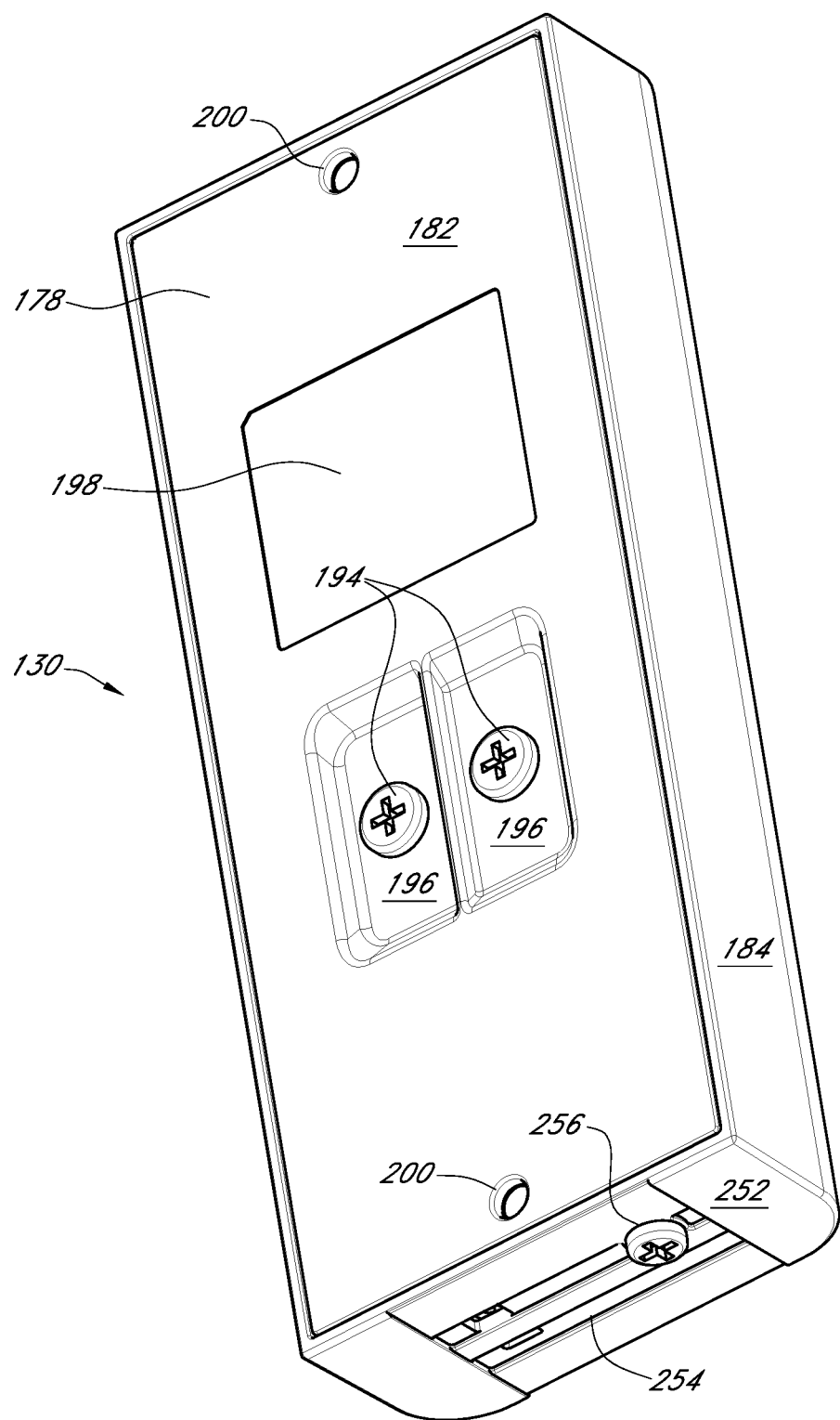
FIG. 5 is a rear perspective view of the A/V recording and communication doorbell of FIG. 4.
Figure 6:
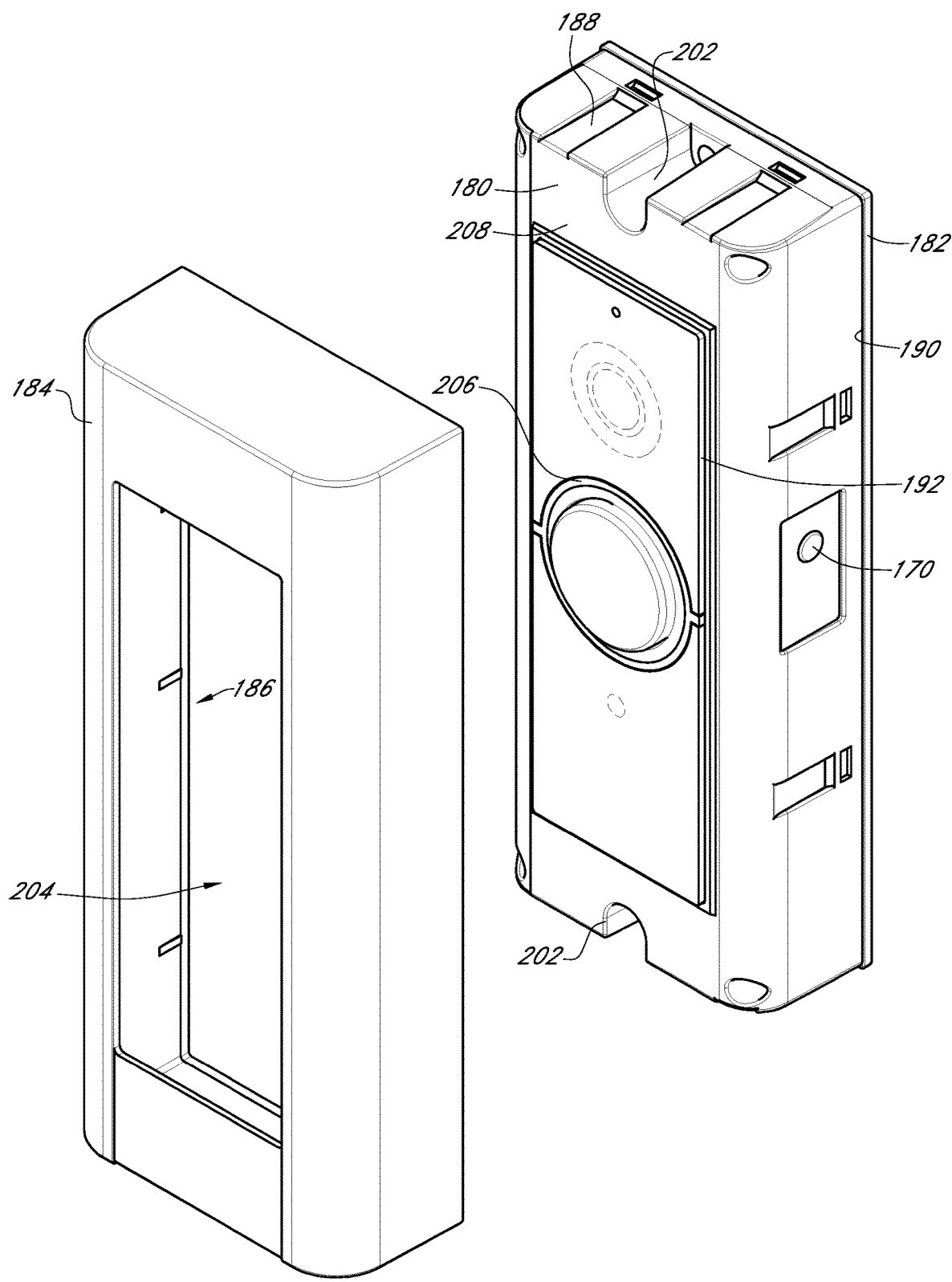
FIG. 6 is a partially exploded front perspective view of the A/V recording and communication doorbell of FIG. 4 showing the cover removed.

With reference to FIGS. 4-6, the A/V recording and communication doorbell 130 further comprises a housing 178 having an enclosure 180 (FIG. 6), a back plate 182 secured to the rear of the enclosure 180, and a shell 184 overlying the enclosure 180. With reference to FIG. 6, the shell 184 includes a recess 186 that is sized and shaped to receive the enclosure 180 in a close fitting engagement, such that outer surfaces of the enclosure 180 abut conforming inner surfaces of the shell 184. Exterior dimensions of the enclosure 180 may be closely matched with interior dimensions of the shell 184 such that friction maintains the shell 184 about the enclosure 180. Alternatively, or in addition, the enclosure 180 and/or the shell 184 may include mating features 188, such as one or more tabs, grooves, slots, posts, etc. to assist in maintaining the shell 184 about the enclosure 180. The back plate 182 is sized and shaped such that the edges of the back plate 182 extend outward from the edges of the enclosure 180, thereby creating a lip 190 against which the shell 184 abuts when the shell 184 is mated with the enclosure 180, as shown in FIGS. 4 and 5. In some embodiments, multiple shells 184 in different colors may be provided so that the end user may customize the appearance of his or her A/V recording and communication doorbell 130. For example, the A/V recording and communication doorbell 130 may be packaged and sold with multiple shells 184 in different colors in the same package.

With reference to FIG. 4, a front surface of the A/V recording and communication doorbell 130 includes the button 148 (may also be referred to as front button 148, FIG. 3), which is operatively connected to the processor 160. In a process similar to that described above with reference to FIG. 2, when a visitor presses the front button 148, an alert may be sent to the user's client device 114 to notify the user that someone is at his or her front door (or at another location corresponding to the location of the A/V recording and communication doorbell 130). With further reference to FIG. 4, the A/V recording and communication doorbell 130 further includes the camera 154, which is operatively connected to the processor 160, and which is located behind a shield 192. As described in detail below, the camera 154 is configured to capture video images from within its field of view. Those video images can be streamed to the user's client device 114 and/or uploaded to a remote network device for later viewing according to a process similar to that described above with reference to FIG. 2.

With reference to FIG. 5, a pair of terminal screws 194 extends through the back plate 182. The terminal screws 194 are connected at their inner ends to the terminals 131, 132 (FIG. 3) within the A/V recording and communication doorbell 130. The terminal screws 194 are configured to receive electrical wires to connect to the A/V recording and communication doorbell 130, through the terminals 131, 132, to the household AC power supply 134 of the structure on which the A/V recording and communication doorbell 130 is mounted. In the illustrated embodiment, the terminal screws 194 are located within a recessed portion 196 of the rear surface 198 of the back plate 182 so that the terminal screws 194 do not protrude from the outer envelope of the A/V recording and communication doorbell 130. The A/V recording and communication doorbell 130 can thus be mounted to a mounting surface with the rear surface 198 of the back plate 182 abutting the mounting surface. The back plate 182 includes apertures 200 adjacent to its upper and lower edges to accommodate mounting hardware, such as screws (not shown), for securing the back plate 182 (and thus the A/V recording and communication doorbell 130) to the mounting surface. With reference to FIG. 6, the enclosure 180 includes corresponding apertures 202 adjacent its upper and lower edges that align with the apertures 200 in the back plate 182 to accommodate the mounting hardware. In certain embodiments, the A/V recording and communication doorbell 130 may include a mounting plate or bracket (not shown) to facilitate securing the A/V recording and communication doorbell 130 to the mounting surface.

Figure 10:
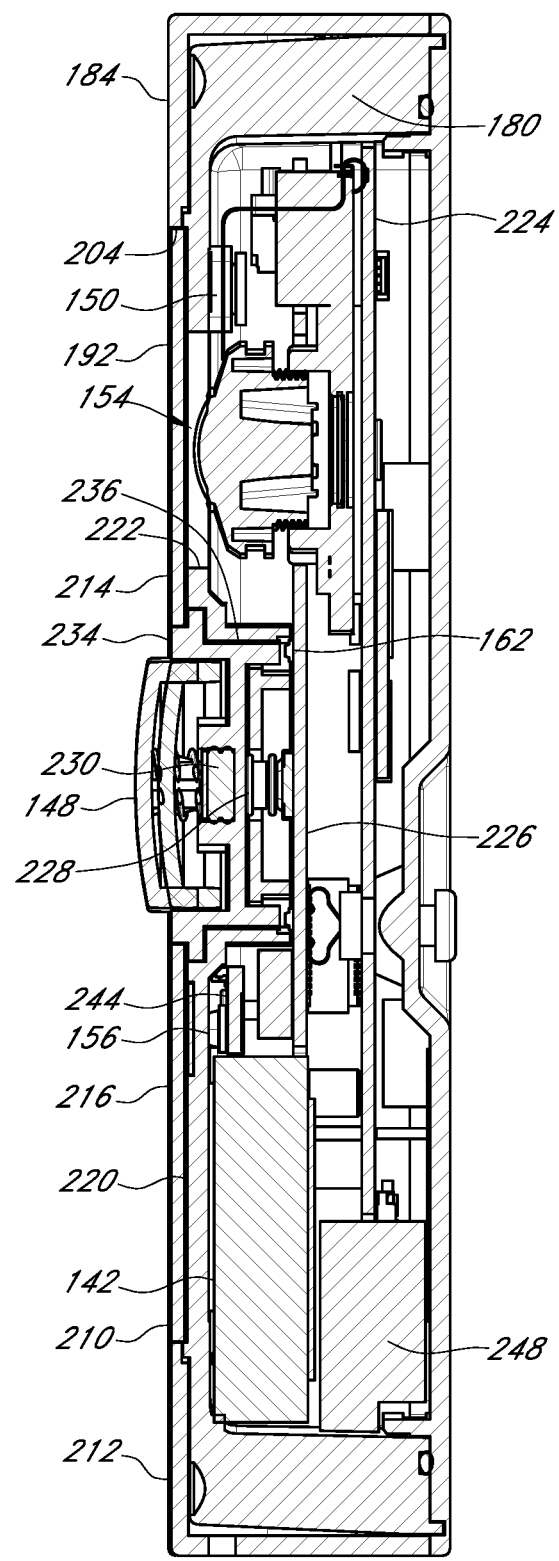
FIG. 10 is a right-side cross-sectional view of the A/V recording and communication doorbell of FIG. 4 taken through the line 10-10 in FIG. 4.

With further reference to FIG. 6, the shell 184 includes a central opening 204 in a front surface. The central opening 204 is sized and shaped to accommodate the shield 192. In the illustrated embodiment, the shield 192 is substantially rectangular, and includes a central opening 206 through which the front button 148 protrudes. The shield 192 defines a plane parallel to and in front of a front surface 208 of the enclosure 180. When the shell 184 is mated with the enclosure 180, as shown in FIGS. 4 and 10, the shield 192 resides within the central opening 204 of the shell 184 such that a front surface 210 of the shield 192 is substantially flush with a front surface 212 of the shell 184 and there is little or no gap (FIG. 4) between the outer edges of the shield 192 and the inner edges of the central opening 204 in the shell 184.

With further reference to FIG. 6, the shield 192 includes an upper portion 214 (located above and to the sides of the front button 148) and a lower portion 216 (located below and to the sides of the front button 148). The upper and lower portions 214, 216 of the shield 192 may be separate pieces, and may comprise different materials. The upper portion 214 of the shield 192 may be transparent or translucent so that it does not interfere with the field of view of the camera 154. For example, in certain embodiments the upper portion 214 of the shield 192 may comprise glass or plastic. As described in detail below, the microphone 150, which is operatively connected to the processor 160, is located behind the upper portion 214 of the shield 192. The upper portion 214, therefore, may include an opening 218 that facilitates the passage of sound through the shield 192 so that the microphone 150 is better able to pick up sounds from the area around the A/V recording and communication doorbell 130.

The lower portion 216 of the shield 192 may comprise a material that is substantially transparent to infrared (IR) light, but partially or mostly opaque with respect to light in the visible spectrum. For example, in certain embodiments the lower portion 216 of the shield 192 may comprise a plastic, such as polycarbonate. The lower portion 216 of the shield 192, therefore, does not interfere with transmission of IR light from the IR light source 156, which is located behind the lower portion 216. As described in detail below, the IR light source 156 and the IR cut filter 158, which are both operatively connected to the processor 160, facilitate "night vision" functionality of the camera 154.

The upper portion 214 and/or the lower portion 216 of the shield 192 may abut an underlying cover 220 (FIG. 10), which may be integral with the enclosure 180 or may be a separate piece. The cover 220, which may be opaque, may include a first opening 222 corresponding to the location of the camera 154, a second opening (not shown) corresponding to the location of the microphone 150 and the opening 218 in the upper portion 214 of the shield 192, and a third opening (not shown) corresponding to the location of the IR light source 156.

Figure 7:
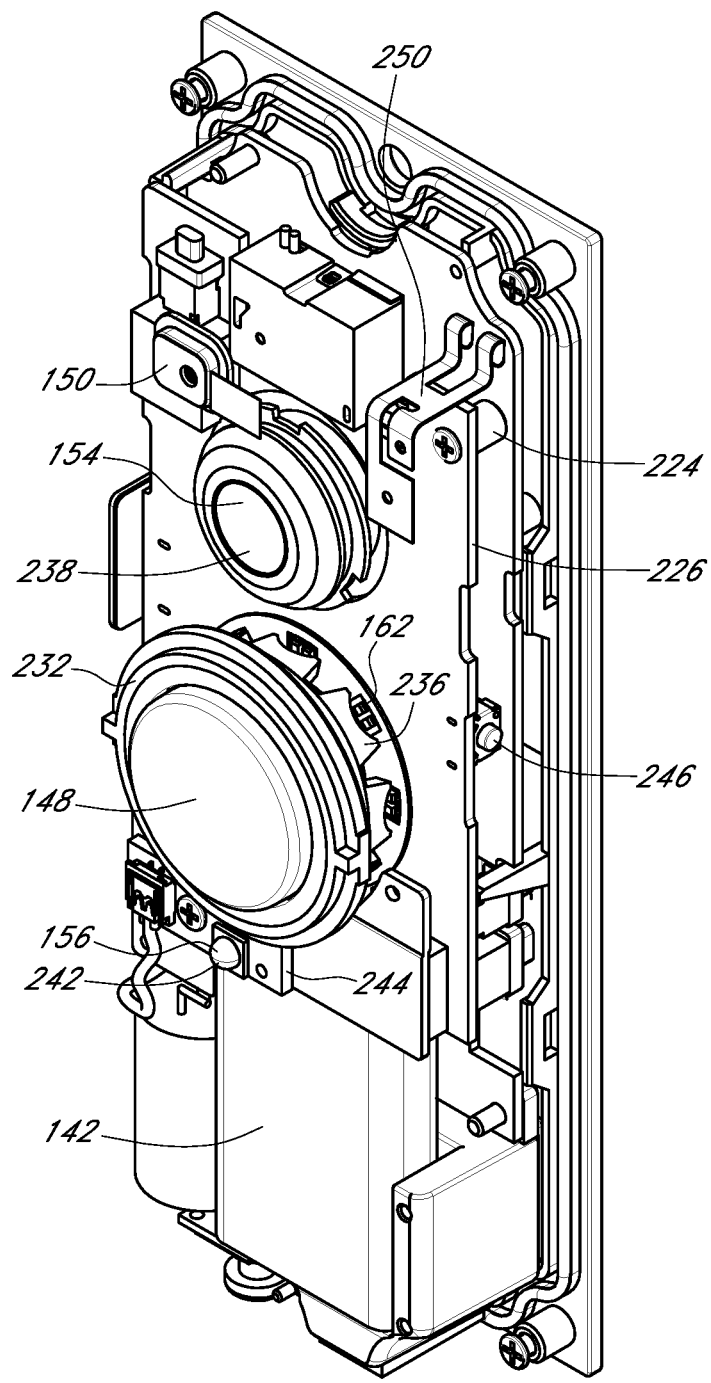
FIGS. 7, 8, and 9 are front perspective views of various internal components of the A/V recording and communication doorbell of FIG. 4.
Figure 8:
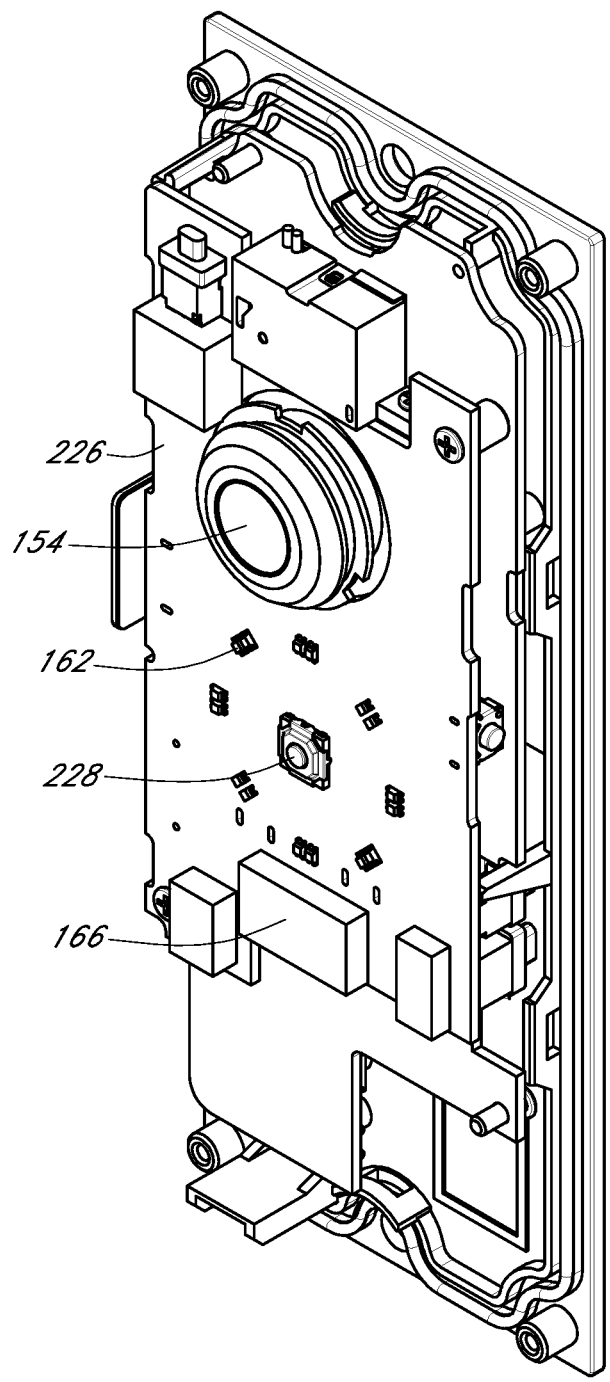
Figure 9:
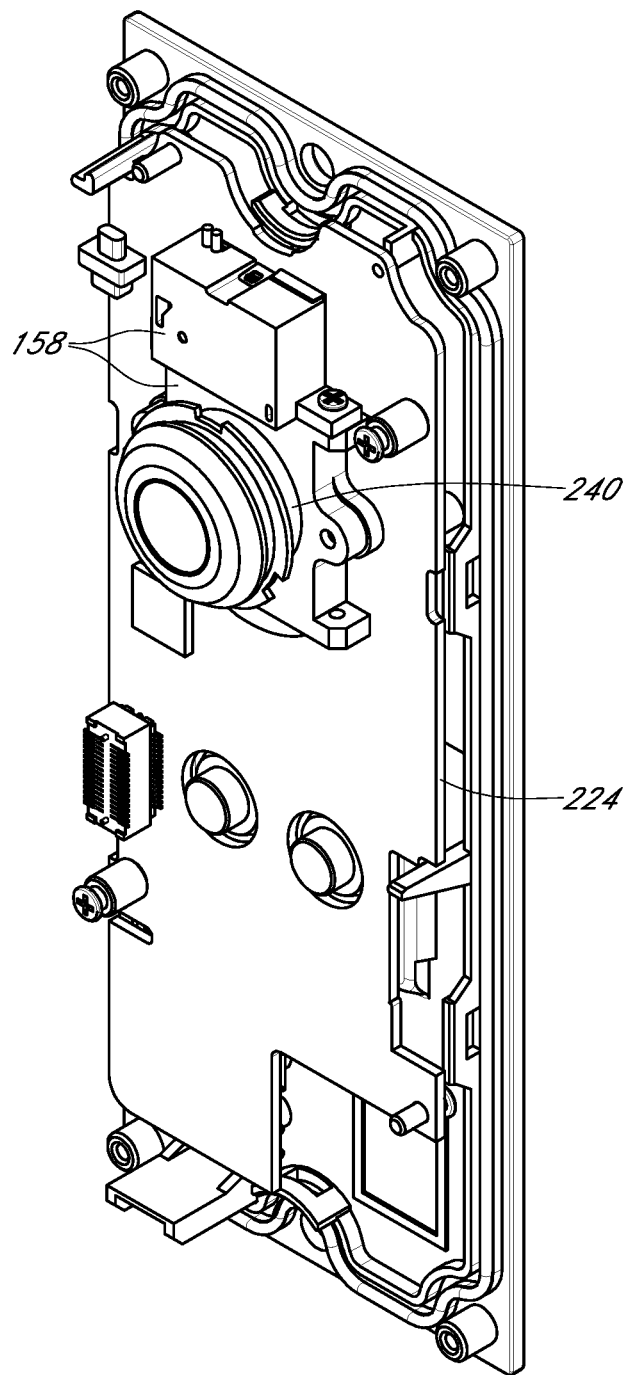

FIGS. 7-10 illustrate various internal components of the A/V recording and communication doorbell 130. FIGS. 7-9 are front perspective views of the doorbell 130 with the shell 184 and the enclosure 180 removed, while FIG. 10 is a right-side cross-sectional view of the doorbell 130 taken through the line 10-10 in FIG. 4. With reference to FIGS. 7 and 8, the A/V recording and communication doorbell 130 further comprises a main printed circuit board (PCB) 224 and a front PCB 226. With reference to FIG. 8, the front PCB 226 comprises a button actuator 228. With reference to FIGS. 7, 8, and 10, the front button 148 is located in front of the button actuator 228. The front button 148 includes a stem 230 (FIG. 10) that extends into the housing 178 to contact the button actuator 228. When the front button 148 is pressed, the stem 230 depresses the button actuator 228, thereby closing the electronic switch 166 (FIG. 8), as described below.

With reference to FIG. 8, the front PCB 226 further comprises the light indicators 162, which may illuminate when the front button 148 of the doorbell 130 is pressed. In the illustrated embodiment, the light indicators 162 comprise light-emitting diodes (LEDs 162) that are surface mounted to the front surface of the front PCB 226 and are arranged in a circle around the button actuator 228. The present embodiments are not limited to the light indicators 162 being LEDs, and in alternative embodiments the light indicators 162 may comprise any other type of light-emitting device. The present embodiments are also not limited by the number of light indicators 162 shown in FIG. 8, nor by the pattern in which they are arranged.

With reference to FIG. 7, the doorbell 130 further comprises a light pipe 232. The light pipe 232 is a transparent or translucent ring that encircles the front button 148. With reference to FIG. 4, the light pipe 232 resides in an annular space between the front button 148 and the central opening 206 in the shield 192, with a front surface 234 of the light pipe 232 being substantially flush with the front surface 210 of the shield 192. With reference to FIGS. 7 and 10, a rear portion of light pipe 232 includes a plurality of posts 236 whose positions correspond to the positions of the LEDs 162. When the LEDs 162 are illuminated, light is transmitted through the posts 236 and the body of the light pipe 232 so that the light is visible at the front surface 234 of the light pipe 232. The LEDs 162 and the light pipe 232 thus provide a ring of illumination around the front button 148. The light pipe 232 may comprise a plastic, for example, or any other suitable material capable of transmitting light.

The LEDs 162 and the light pipe 232 may function as visual indicators for a visitor and/or a user. For example, the LEDs 162 may illuminate upon activation or stay illuminated continuously. In one aspect, the LEDs 162 may change color to indicate that the front button 148 has been pressed. The LEDs 162 may also indicate that the battery 142 needs recharging, or that the battery 142 is currently being charged, or that charging of the battery 142 has been completed. The LEDs 162 may indicate that a connection to the user's wireless network is good, limited, poor, or not connected. The LEDs 162 may be used to guide the user through setup or installation steps using visual cues, potentially coupled with audio cues emitted from the speaker 152.

With further reference to FIG. 7, the A/V recording and communication doorbell 130 further comprises a rechargeable battery 142. As described in further detail below, the A/V recording and communication doorbell 130 is connected to an external power source 134 (FIG. 3), such as AC mains. The A/V recording and communication doorbell 130 is primarily powered by the external power source 134, but may also draw power from the rechargeable battery 142 so as not to exceed a threshold amount of power from the external power source 134, to thereby avoid inadvertently sounding the signaling device 168. With reference to FIG. 3, the battery 142 is operatively connected to the power manager 140. As described below, the power manager 140 controls an amount of power drawn from the battery 142 to supplement the power drawn from the external AC power source 134 to power the A/V recording and communication doorbell 130 when supplemental power is needed. The power manager 140 also controls recharging of the battery 142 using power drawn from the external power source 134. The battery 142 may comprise, for example, a lithium-ion battery, or any other type of rechargeable battery.

With further reference to FIG. 7, the A/V recording and communication doorbell 130 further comprises the camera 154. The camera 154 is coupled to a front surface of the front PCB 226, and includes a lens 238 and an imaging processor 240 (FIG. 9). The camera lens 238 may be a lens capable of focusing light into the camera 154 so that clear images may be captured. The camera 154 may comprise, for example, a high definition (HD) video camera, such as one capable of capturing video images at an image display resolution of 720p or better. In certain of the present embodiments, the camera 154 may be used to detect motion within its field of view, as described below.

With further reference to FIG. 7, the A/V recording and communication doorbell 130 further comprises an infrared (IR) light source 242. In the illustrated embodiment, the IR light source 242 comprises an IR light-emitting diode (LED) 242 coupled to an IR LED printed circuit board (PCB) 244. In alternative embodiments, the IR LED 242 may not comprise a separate PCB 244, and may, for example, be coupled to the front PCB 226.

With reference to FIGS. 7 and 10, the IR LED PCB 244 is located below the front button 148 (FIG. 7) and behind the lower portion 216 of the shield 192 (FIG. 10). As described above, the lower portion 216 of the shield 192 is transparent to IR light, but may be opaque with respect to light in the visible spectrum.

The IR LED 242 may be triggered to activate when a low level of ambient light is detected. When activated, IR light emitted from the IR LED 242 illuminates the camera 154's field of view. The camera 154, which may be configured to detect IR light, may then capture the IR light emitted by the IR LED 242 as it reflects off objects within the camera 154's field of view, so that the A/V recording and communication doorbell 130 can clearly capture images at night (may be referred to as "night vision").

With reference to FIG. 9, the A/V recording and communication doorbell 130 further comprises an IR cut filter 158. The IR cut filter 158 is a mechanical shutter that can be selectively positioned between the lens 238 and the image sensor of the camera 154. During daylight hours, or whenever there is a sufficient amount of ambient light, the IR cut filter 158 is positioned between the lens 238 and the image sensor to filter out IR light so that it does not distort the colors of images as the human eye sees them. During nighttime hours, or whenever there is little to no ambient light, the IR cut filter 158 is withdrawn from the space between the lens 238 and the image sensor, so that the camera 154 is sensitive to IR light ("night vision"). In some embodiments, the camera 154 acts as a light detector for use in controlling the current state of the IR cut filter 158 and turning the IR LED 242 on and off. Using the camera 154 as a light detector is facilitated in some embodiments by the fact that the A/V recording and communication doorbell 130 is powered by a connection to AC mains, and the camera 154, therefore, is always powered on. In other embodiments, however, the A/V recording and communication doorbell 130 may include a light sensor separate from the camera 154 for use in controlling the IR cut filter 158 and the IR LED 242.

With reference back to FIG. 6, the A/V recording and communication doorbell 130 further comprises a reset button 170. The reset button 170 contacts a reset button actuator 246 (FIG. 7) coupled to the front PCB 226. When the reset button 170 is pressed, it may contact the reset button actuator 246, which may trigger the erasing of any data stored at the non-volatile memory 174 and/or at the memory 172 (FIG. 3), and/or may trigger a reboot of the processor 160.

Figure 11:
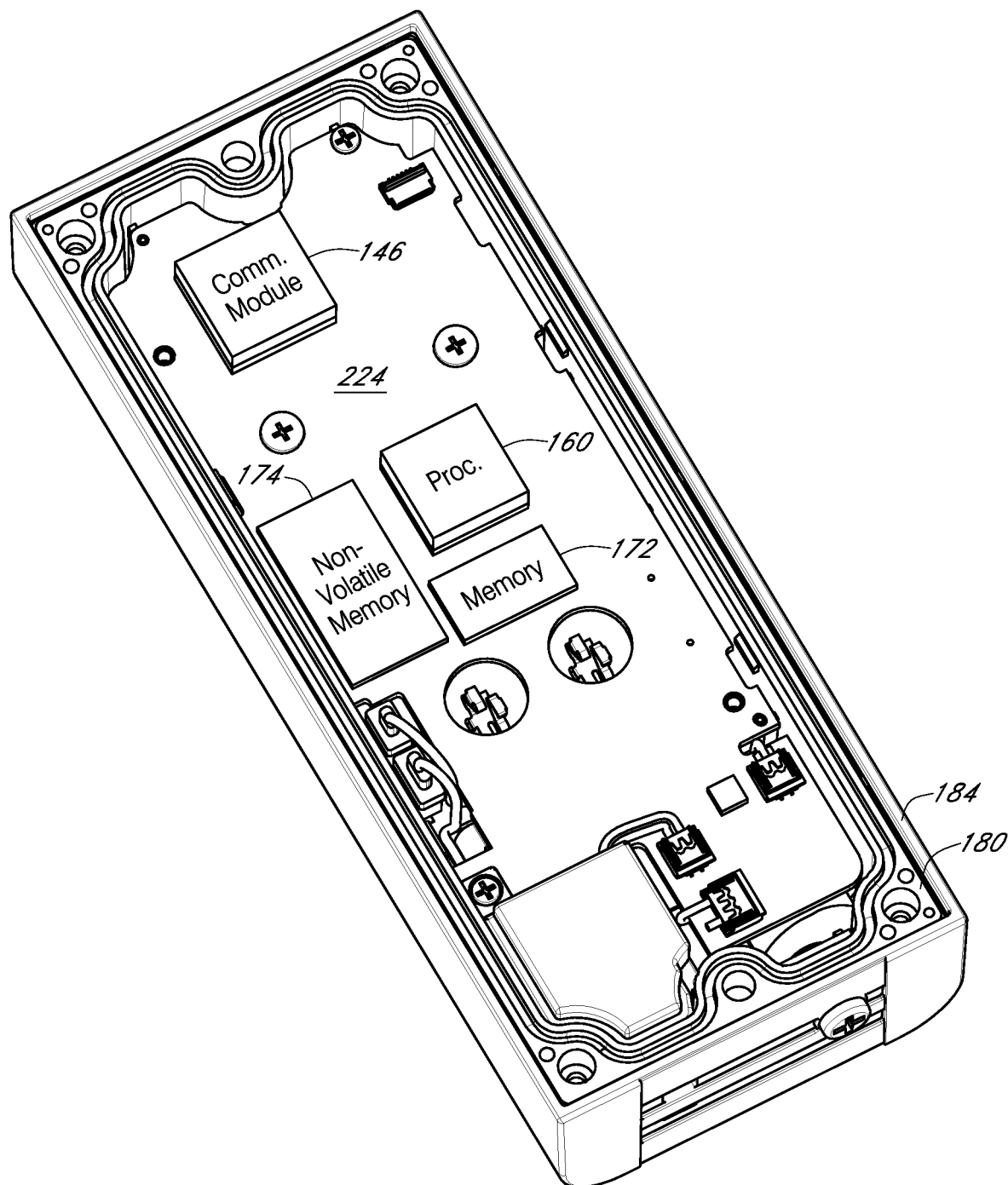
FIGS. 11-13 are rear perspective views of various internal components of the A/V recording and communication doorbell of FIG. 4.
Figure 12:
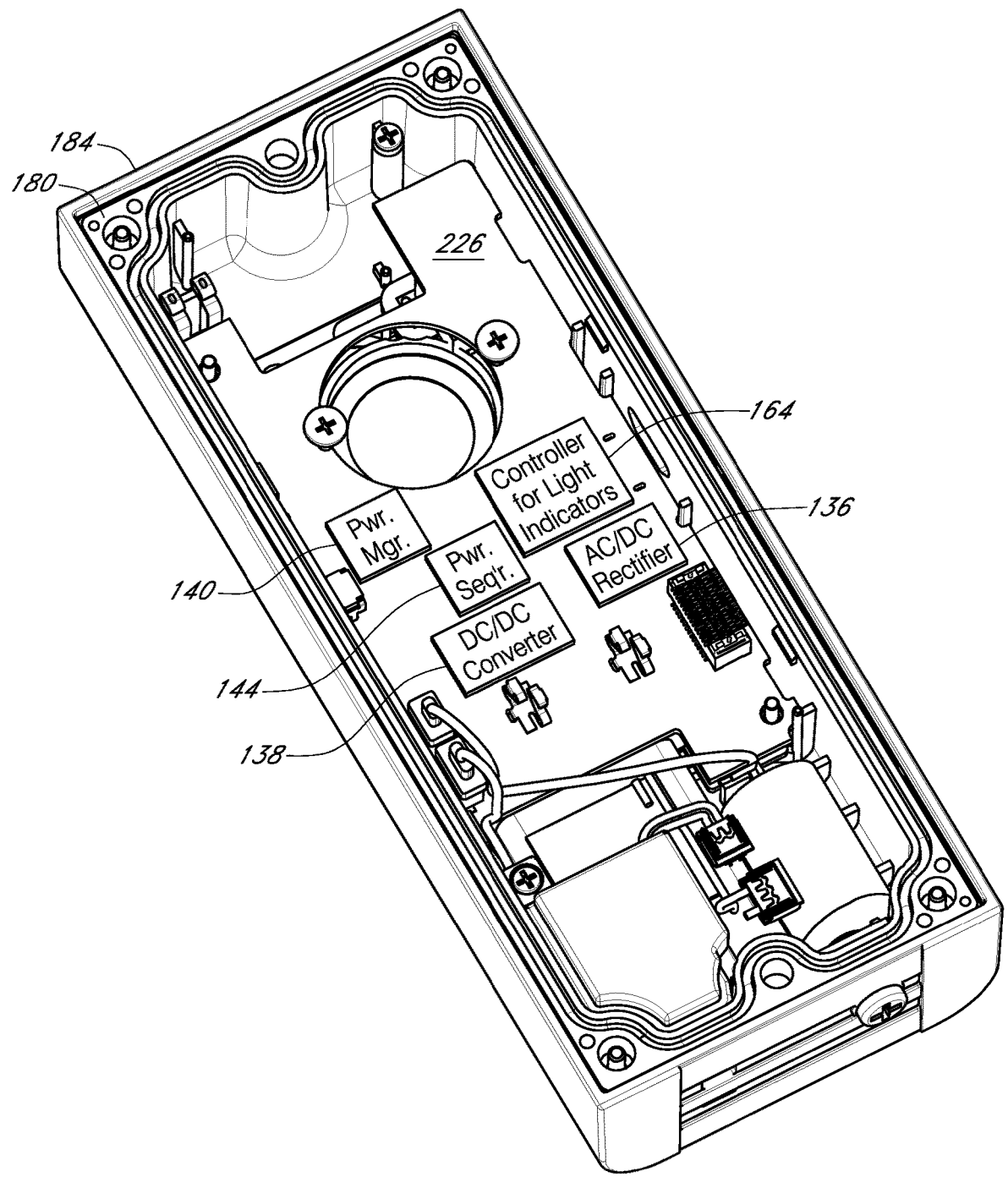
Figure 13:
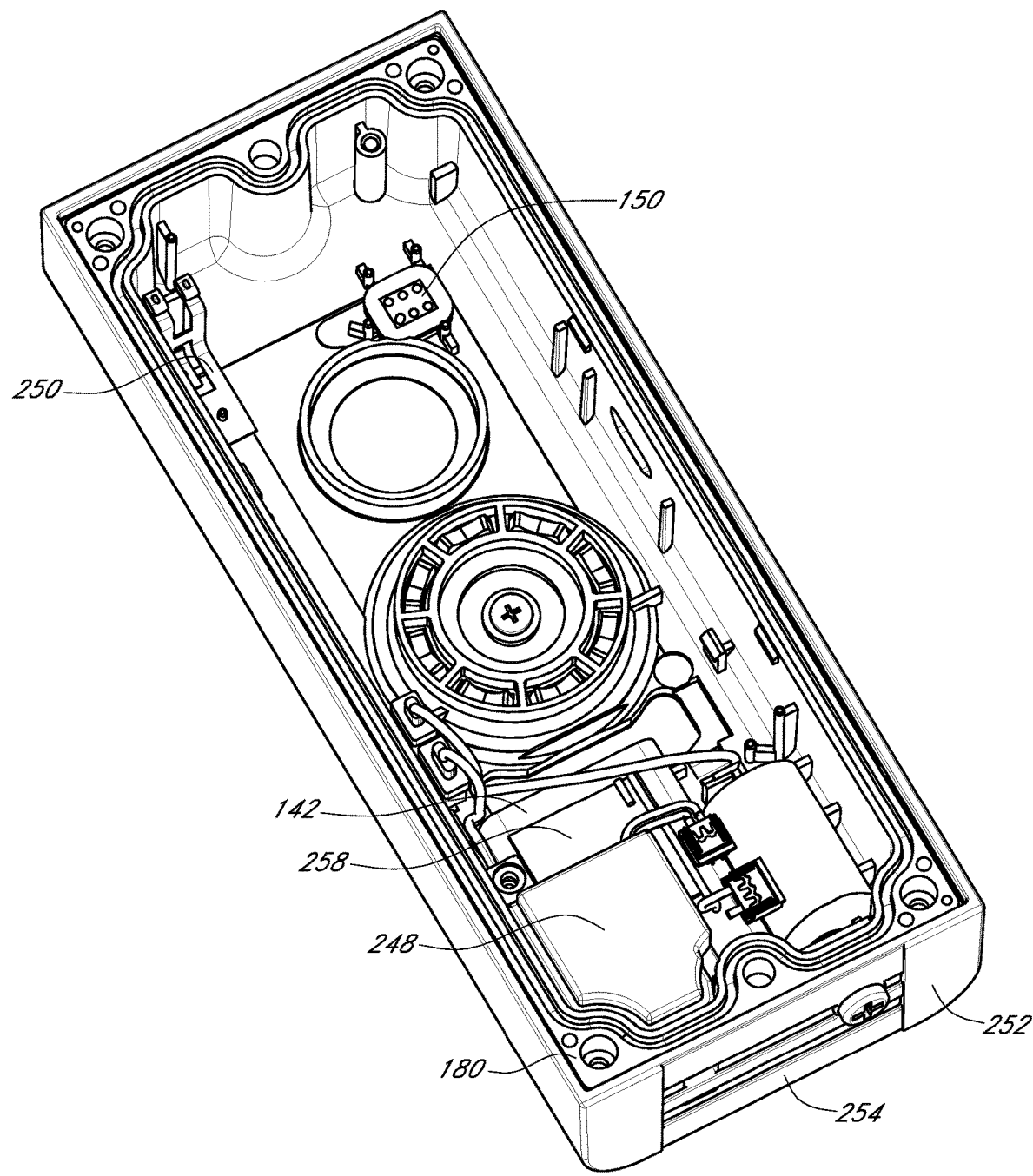

FIGS. 11-13 further illustrate internal components of the A/V recording and communication doorbell 130. FIGS. 11-13 are rear perspective views of the doorbell 130 with the back plate 182 and additional components removed. For example, in FIG. 11 the back plate 182 is removed, while in FIG. 12 the back plate 182 and the main PCB 224 are removed, and in FIG. 13 the back plate 182, the main PCB 224, and the front PCB 226 are removed. With reference to FIG. 11, several components are coupled to the rear surface of the main PCB 224, including the communication module 146, the processor 160, memory 172, and non-volatile memory 174. The functions of each of these components are described below. With reference to FIG. 12, several components are coupled to the rear surface of the front PCB 226, including the power manager 140, the power sequencer 144, the AC/DC rectifier 136, the DC/DC converter 138, and the controller 164 for the light indicators 162. The functions of each of these components are also described below. With reference to FIG. 13, several components are visible within the enclosure 180, including the microphone 150, a speaker chamber 248 (in which the speaker 152 is located), and an antenna 250 for the communication module 146. The functions of each of these components are also described below.

With reference to FIG. 7, the antenna 250 is coupled to the front surface of the main PCB 224 and operatively connected to the communication module 146, which is coupled to the rear surface of the main PCB 224 (FIG. 11). The microphone 150, which may also be coupled to the front surface of the main PCB 224, is located near the opening 218 (FIG. 4) in the upper portion 214 of the shield 192 so that sounds emanating from the area around the A/V recording and communication doorbell 130 can pass through the opening 218 and be detected by the microphone 150. With reference to FIG. 13, the speaker chamber 248 is located near the bottom of the enclosure 180. The speaker chamber 248 comprises a hollow enclosure in which the speaker 152 is located. The hollow speaker chamber 248 amplifies the sounds made by the speaker 152 so that they can be better heard by a visitor in the area near the A/V recording and communication doorbell 130. With reference to FIGS. 5 and 13, the lower surface 252 of the shell 184 and the lower surface (not shown) of the enclosure 180 may include an acoustical opening 254 through which the sounds made by the speaker 152 can pass so that they can be better heard by a visitor in the area near the A/V recording and communication doorbell 130. In the illustrated embodiment, the acoustical opening 254 is shaped generally as a rectangle having a length extending substantially across the lower surface 252 of the shell 184 (and also the enclosure 180). The illustrated shape is, however, just one example. With reference to FIG. 5, the lower surface 252 of the shell 184 may further include an opening 256 for receiving a security screw (not shown). The security screw may extend through the opening 256 and into a similarly located opening in the enclosure 180 to secure the shell 184 to the enclosure 180. If the doorbell 130 is mounted to a mounting bracket (not shown), the security screw may also maintain the doorbell 130 on the mounting bracket.

With reference to FIG. 13, the A/V recording and communication doorbell 130 may further include a battery heater 258. The present A/V recording and communication doorbell 130 is configured for outdoor use, including in cold climates. Cold temperatures, however, can cause negative performance issues for rechargeable batteries, such as reduced energy capacity, increased internal resistance, reduced ability to charge without damage, and reduced ability to supply load current. The battery heater 258 helps to keep the rechargeable battery 142 warm in order to reduce or eliminate the foregoing negative performance issues. In the illustrated embodiment, the battery heater 258 comprises a substantially flat, thin sheet abutting a side surface of the rechargeable battery 142. The battery heater 258 may comprise, for example, an electrically resistive heating element that produces heat when electrical current is passed through it. The battery heater 258 may thus be operatively coupled to the power manager 140 and/or the power sequencer 144 (FIG. 12). In some embodiments, the rechargeable battery 142 may include a thermally sensitive resistor ("thermistor," not shown) operatively connected to the processor 160 so that the battery 142's temperature can be monitored and the amount of power supplied to the battery heater 258 can be adaptively controlled to keep the rechargeable battery 142 within a desired temperature range.

As described above, the present embodiments advantageously limit the power consumption of the A/V recording and communication doorbell to an amount that is below the threshold necessary for causing the signaling device to sound (except when the front button of the doorbell is pressed). The present A/V recording and communication doorbell can thus be connected to the existing household AC power supply and the existing signaling device without causing inadvertent sounding of the signaling device.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some embodiments, about 10-15 seconds of recorded footage can be continuously stored in the rolling buffer or sliding window. Also because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact, although in some alternative embodiments the doorbell may include one or more PIRs and/or other motion detectors, heat source detectors, etc. Also because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V recording and communication doorbell and enabling the doorbell to be made even more compact, although in some alternative embodiments the doorbell may include a separate light detector.

Figure 14:
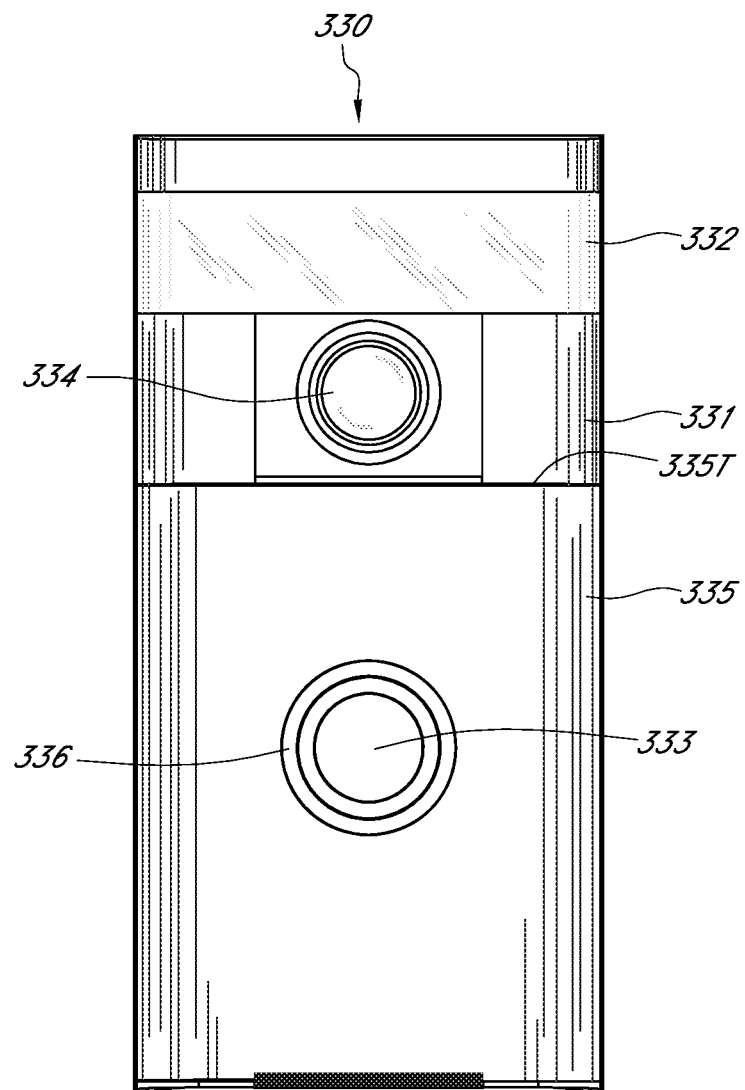
FIG. 14 is a front view of an A/V recording and communication device according to various aspects of the present disclosure.
Figure 15:
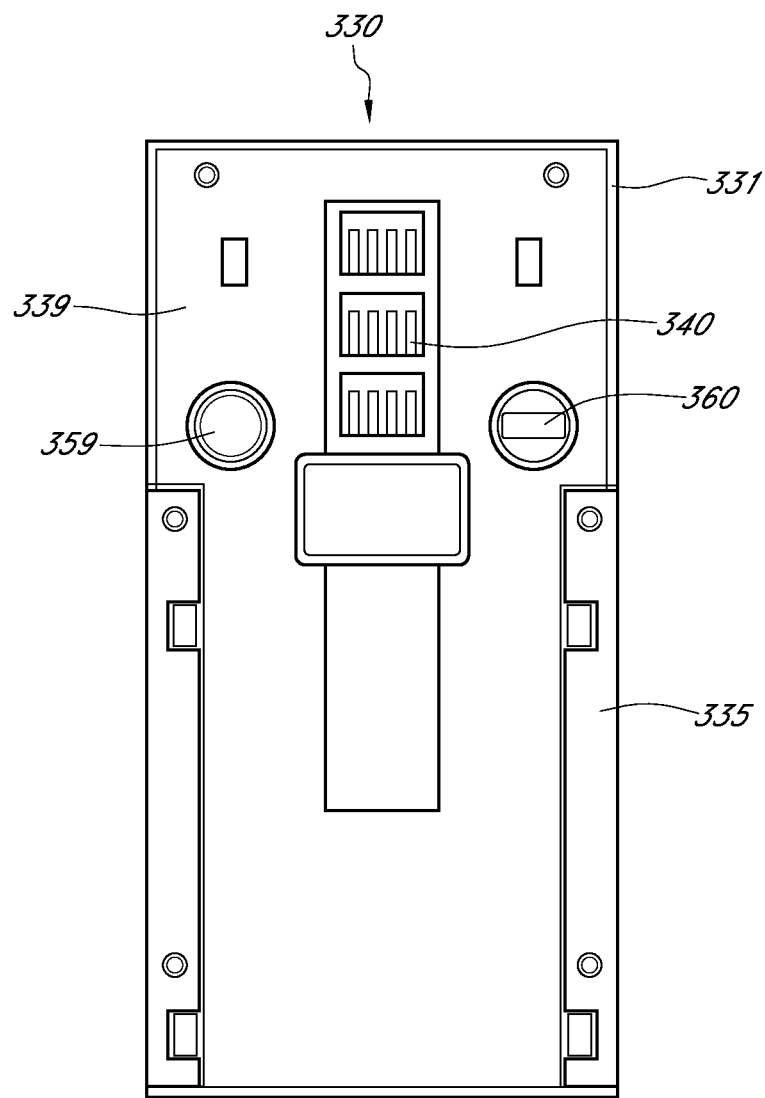
FIG. 15 is a rear view of the A/V recording and communication device of FIG. 14.
Figure 16:
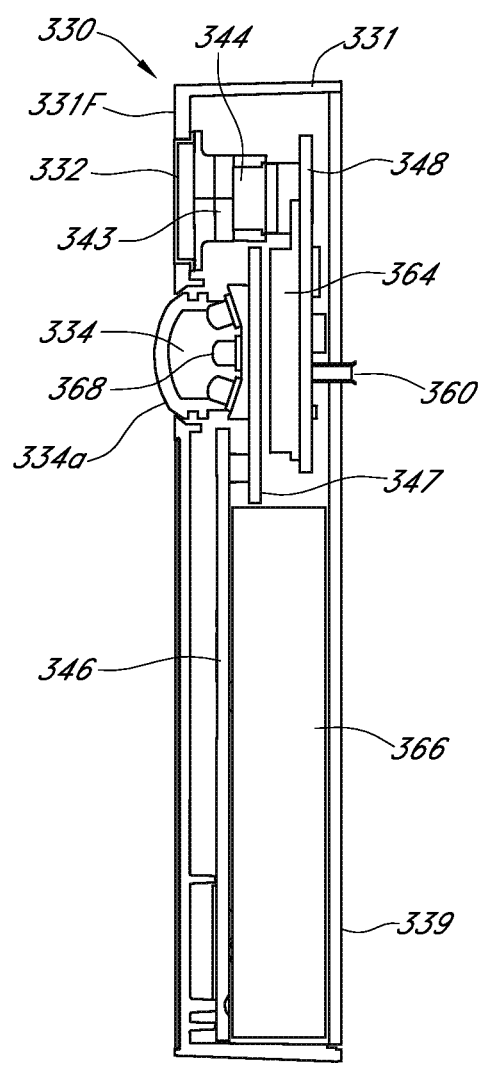
FIG. 16 is cross-sectional right side view of the A/V recording and communication device of FIG. 14.
Figure 17:
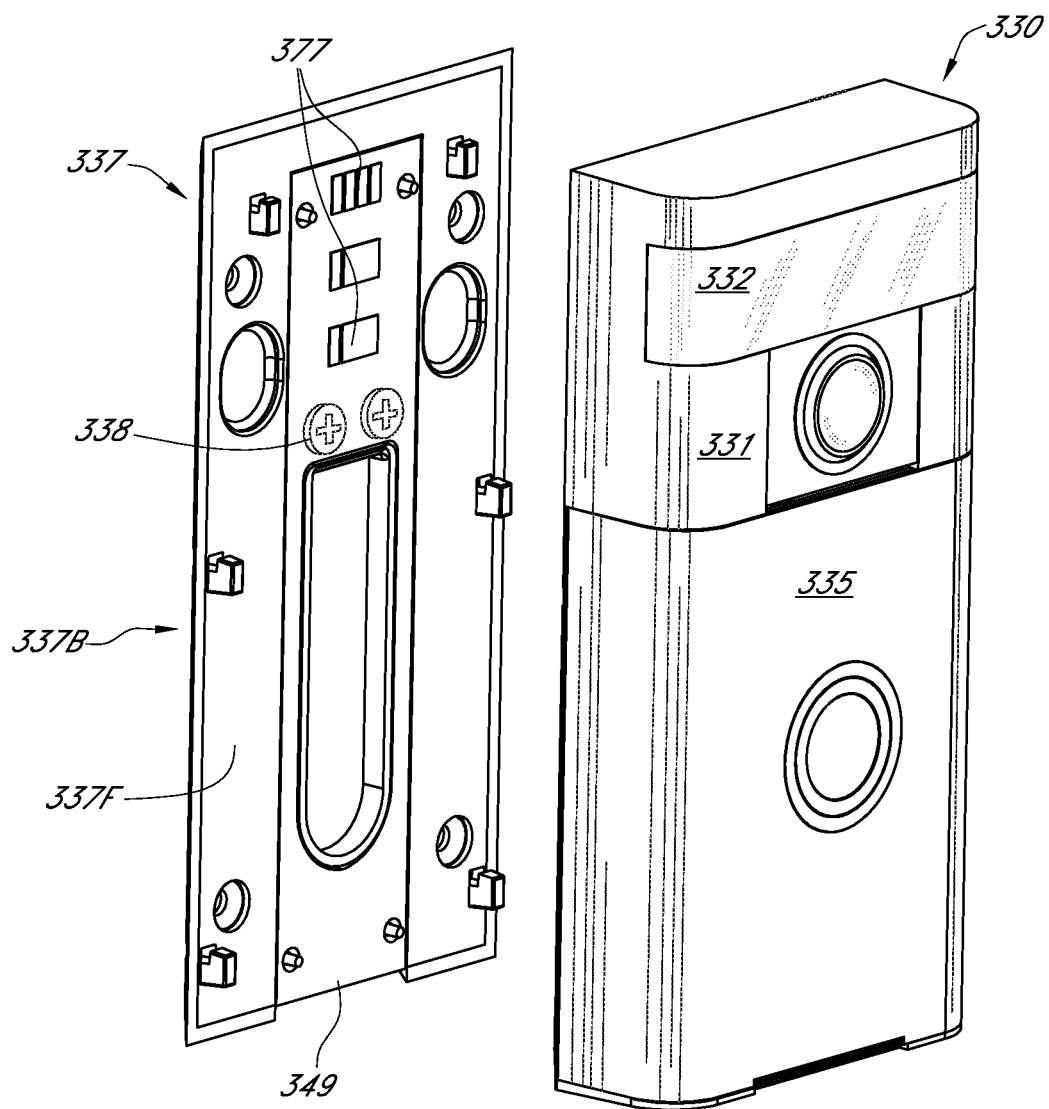
FIG. 17 is an exploded view of the A/V recording and communication device of FIG. 14 and a mounting bracket.

FIGS. 14-18 illustrate another embodiment of a wireless audio/video (A/V) communication doorbell 330 according to an aspect of present embodiments. FIG. 14 is a front view, FIG. 15 is a rear view, FIG. 16 is a right-side cross-sectional view, and FIG. 17 is an exploded view of the doorbell 330 and a mounting bracket 337. As described below, the doorbell 330 is configured to be connected to an external power source, such as household wiring, but is also configured to be powered by an on-board rechargeable battery instead of, or in addition to, the external power source.

The doorbell 330 includes a faceplate 335 mounted to a back plate 339 (FIG. 15). With reference to FIG. 16, the faceplate 335 has a substantially flat profile. The faceplate 335 may comprise any suitable material, including, without limitation, metals, such as brushed aluminum or stainless steel, metal alloys, or plastics. The faceplate 335 protects the internal contents of the doorbell 330 and serves as an exterior front surface of the doorbell 330.

With reference to FIG. 14, the faceplate 335 includes a button 333 and a light pipe 336. The button 333 and the light pipe 336 may have various profiles that may or may not match the profile of the faceplate 335. The light pipe 336 may comprise any suitable material, including, without limitation, transparent plastic, that is capable of allowing light produced within the doorbell 330 to pass through. The light may be produced by one or more light-emitting components, such as light-emitting diodes (LED's), contained within the doorbell 330, as further described below. The button 333 may make contact with a button actuator (not shown) located within the doorbell 330 when the button 333 is pressed by a visitor. When pressed, the button 333 may trigger one or more functions of the doorbell 330, as further described below.

With reference to FIGS. 3 and 4, the doorbell 330 further includes an enclosure 331 that engages the faceplate 335. In the illustrated embodiment, the enclosure 331 abuts an upper edge 335T (FIG. 14) of the faceplate 335, but in alternative embodiments one or more gaps between the enclosure 331 and the faceplate 335 may facilitate the passage of sound and/or light through the doorbell 330. The enclosure 331 may comprise any suitable material, but in some embodiments the material of the enclosure 331 preferably permits infrared light to pass through from inside the doorbell 330 to the environment and vice versa. The doorbell 330 further includes a lens 332. In some embodiments, the lens may comprise a Fresnel lens, which may be patterned to deflect incoming light into one or more infrared sensors located within the doorbell 330. The doorbell 330 further includes a camera 334, which captures video data when activated, as described below.

FIG. 15 is a rear view of the doorbell 330, according to an aspect of the present embodiments. As illustrated, the enclosure 331 may extend from the front of the doorbell 330 around to the back thereof and may fit snugly around a lip of the back plate 339. The back plate 339 may comprise any suitable material, including, without limitation, metals, such as brushed aluminum or stainless steel, metal alloys, or plastics. The back plate 339 protects the internal contents of the doorbell 330 and serves as an exterior rear surface of the doorbell 330. The faceplate 335 may extend from the front of the doorbell 330 and at least partially wrap around the back plate 339, thereby allowing a coupled connection between the faceplate 335 and the back plate 339. The back plate 339 may have indentations in its structure to facilitate the coupling.

With further reference to FIG. 15, spring contacts 340 may provide power to the doorbell 330 when mated with other conductive contacts connected to a power source. The spring contacts 340 may comprise any suitable conductive material, including, without limitation, copper, and may be capable of deflecting when contacted by an inward force, for example the insertion of a mating element. The doorbell 330 further comprises a connector 360, such as a micro-USB or other connector, whereby power and/or data may be supplied to and from the components within the doorbell 330. A reset button 359 may be located on the back plate 339, and may make contact with a button actuator (not shown) located within the doorbell 330 when the reset button 359 is pressed. When the reset button 359 is pressed, it may trigger one or more functions, as described below.

FIG. 16 is a right side cross-sectional view of the doorbell 330 without the mounting bracket 337. In the illustrated embodiment, the lens 332 is substantially coplanar with the front surface 331F of the enclosure 331. In alternative embodiments, the lens 332 may be recessed within the enclosure 331 or may protrude outward from the enclosure 331. The camera 334 is coupled to a camera printed circuit board (PCB) 347, and a lens 334a of the camera 334 protrudes through an opening in the enclosure 331. The camera lens 334a may be a lens capable of focusing light into the camera 334 so that clear images may be taken.

The camera PCB 347 may be secured within the doorbell with any suitable fasteners, such as screws, or interference connections, adhesives, etc. The camera PCB 347 comprises various components that enable the functionality of the camera 334 of the doorbell 330, as described below. Infrared light-emitting components, such as infrared LED's 368, are coupled to the camera PCB 347 and may be triggered to activate when a light sensor detects a low level of ambient light. When activated, the infrared LED's 368 may emit infrared light through the enclosure 331 and/or the camera 334 out into the ambient environment. The camera 334, which may be configured to detect infrared light, may then capture the light emitted by the infrared LED's 368 as it reflects off objects within the camera's 334 field of view, so that the doorbell 330 can clearly capture images at night (may be referred to as "night vision").

With continued reference to FIG. 16, the doorbell 330 further comprises a front PCB 346, which in the illustrated embodiment resides in a lower portion of the doorbell 330 adjacent a battery 366. The front PCB 346 may be secured within the doorbell 330 with any suitable fasteners, such as screws, or interference connections, adhesives, etc. The front PCB 346 comprises various components that enable the functionality of the audio and light components, as further described below. The battery 366 may provide power to the doorbell 330 components while receiving power from the spring contacts 340, thereby engaging in a trickle-charge method of power consumption and supply. Alternatively, the doorbell 330 may draw power directly from the spring contacts 340 while relying on the battery 366 only when the spring contacts 340 are not providing the power necessary for all functions. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360.

With continued reference to FIG. 16, the doorbell 330 further comprises a power PCB 348, which in the illustrated embodiment resides behind the camera PCB 347. The power PCB 348 may be secured within the doorbell 330 with any suitable fasteners, such as screws, or interference connections, adhesives, etc. The power PCB 348 comprises various components that enable the functionality of the power and device-control components, as further described below.

With continued reference to FIG. 16, the doorbell 330 further comprises a communication module 364 coupled to the power PCB 348. The communication module 364 facilitates communication with client devices in one or more remote locations, as further described below. The connector 360 may protrude outward from the power PCB 348 and extend through a hole in the back plate 339. The doorbell 330 further comprises passive infrared (PIR) sensors 344, which are secured on or within a PIR sensor holder 343, and the assembly resides behind the lens 332. In some embodiments, the doorbell 330 may comprise three PIR sensors 344, as further described below, but in other embodiments any number of PIR sensors 344 may be provided. The PIR sensor holder 343 may be secured to the doorbell 330 with any suitable fasteners, such as screws, or interference connections, adhesives, etc. The PIR sensors 344 may be any type of sensor capable of detecting and communicating the presence of a heat source within their field of view. Further, alternative embodiments may comprise one or more motion sensors either in place of or in addition to the PIR sensors 344. The motion sensors may be configured to detect motion using any methodology, such as a methodology that does not rely on detecting the presence of a heat source within a field of view.

FIG. 17 is an exploded view of the doorbell 330 and the mounting bracket 337 according to an aspect of the present embodiments. The mounting bracket 337 is configured to be mounted to a mounting surface (not shown) of a structure, such as a home or an office. FIG. 17 shows the front side 337F of the mounting bracket 337. The mounting bracket 337 is configured to be mounted to the mounting surface such that the back side 337B thereof faces the mounting surface. In certain embodiments, the mounting bracket 337 may be mounted to surfaces of various composition, including, without limitation, wood, concrete, stucco, brick, vinyl siding, aluminum siding, etc., with any suitable fasteners, such as screws, or interference connections, adhesives, etc. The doorbell 330 may be coupled to the mounting bracket 337 with any suitable fasteners, such as screws, or interference connections, adhesives, etc.

With continued reference to FIG. 17, the illustrated embodiment of the mounting bracket 337 includes the terminal screws 338. The terminal screws 338 are configured to receive electrical wires adjacent the mounting surface of the structure upon which the mounting bracket 337 is mounted, so that the doorbell 330 may receive electrical power from the structure's electrical system. The terminal screws 338 are electrically connected to electrical contacts 377 of the mounting bracket. If power is supplied to the terminal screws 338, then the electrical contacts 377 also receive power through the terminal screws 338. The electrical contacts 377 may comprise any suitable conductive material, including, without limitation, copper, and may protrude slightly from the face of the mounting bracket 337 so that they may mate with the spring contacts 340 located on the back plate 339.

Figure 18:
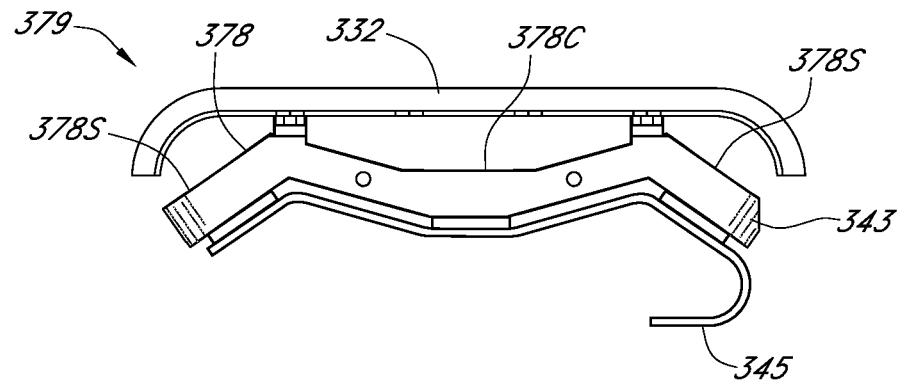
FIG. 18 is a top view of a passive infrared sensor assembly according to various aspects of the present disclosure.

With continued reference to FIG. 17, the mounting bracket 337 further comprises a bracket PCB 349. The bracket PCB 349 is situated outside the doorbell 330, and is therefore configured for various sensors that measure ambient conditions, such as an accelerometer 350, a barometer 351, a humidity sensor 352, and a temperature sensor 353 (FIG. 18). The functions of these components are discussed in more detail below. The bracket PCB 349 may be secured to the mounting bracket 337 with any suitable fasteners, such as screws, or interference connections, adhesives, etc.

With continued reference to FIG. 17, the faceplate 335 may extend from the bottom of the doorbell 330 up to just below the camera 334, and connect to the back plate 339 as described above. The lens 332 may extend and curl partially around the side of the doorbell 330. The enclosure 331 may extend and curl around the side and top of the doorbell 330, and may be coupled to the back plate 339 as described above. The camera 334 may protrude slightly through the enclosure 331, thereby giving it a wider field of view. The mounting bracket 337 may couple with the back plate 339 such that they contact each other at various points in a common plane of contact, thereby creating an assembly including the doorbell 330 and the mounting bracket 337. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 19:
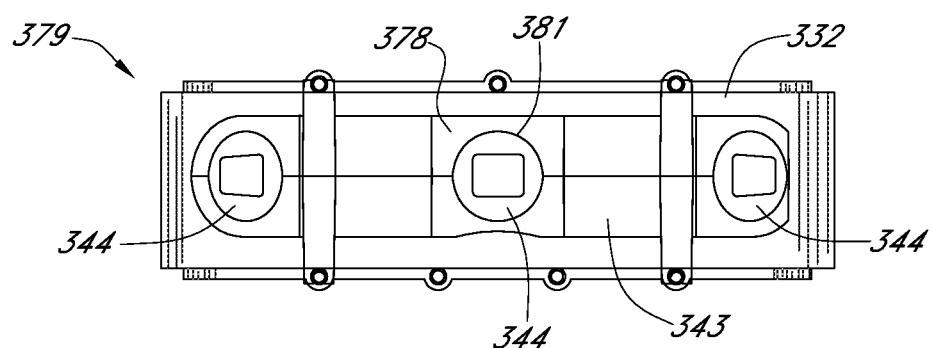
FIG. 19 is a front view of the passive infrared sensor assembly of FIG. 18.

FIG. 18 is a top view and FIG. 19 is a front view of a passive infrared sensor assembly 179 including the lens 132, the passive infrared sensor holder 143, the passive infrared sensors 144, and a flexible power circuit 145. The passive infrared sensor holder 143 is configured to mount the passive infrared sensors 144 facing out through the lens 132 at varying angles, thereby allowing the passive infrared sensor 144 field of view to be expanded to 180° or more and also broken up into various zones, as further described below. The passive infrared sensor holder 143 may include one or more faces 178, including a center face 178C and two side faces 178S to either side of the center face 178C. With reference to FIG. 19, each of the faces 178 defines an opening 181 within or on which the passive infrared sensors 144 may be mounted. In alternative embodiments, the faces 178 may not include openings 181, but may instead comprise solid flat faces upon which the passive infrared sensors 144 may be mounted. Generally, the faces 178 may be any physical structure capable of housing and/or securing the passive infrared sensors 144 in place.

With reference to FIG. 18, the passive infrared sensor holder 143 may be secured to the rear face of the lens 132. The flexible power circuit 145 may be any material or component capable of delivering power and/or data to and from the passive infrared sensors 144, and may be contoured to conform to the non-linear shape of the passive infrared sensor holder 143. The flexible power circuit 145 may connect to, draw power from, and/or transmit data to and from, the power printed circuit board 148.

Figure 20:
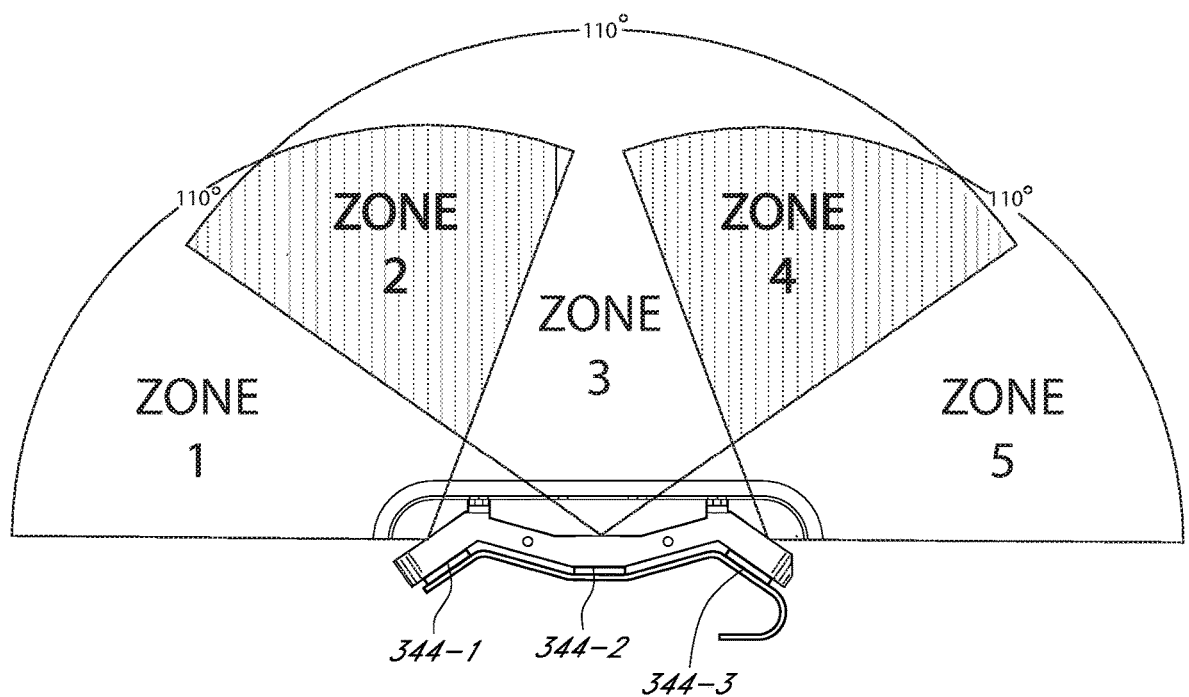
FIG. 20 is a top view of the passive infrared sensor assembly of FIG. 18, illustrating the fields of view of the passive infrared sensors according to various aspects of the present disclosure.

FIG. 20 is a top view of the passive infrared sensor assembly 179 illustrating the fields of view of the passive infrared sensors 144. In the illustrated embodiment, the side faces 178S of the passive infrared sensor holder 143 are angled at 55° facing outward from the center face 178C, and each passive infrared sensor 144 has a field of view of 110°. However, these angles may be increased or decreased as desired. Zone 1 is the area that is visible only to a first one of the passive infrared sensors 144-1. Zone 2 is the area that is visible only to the first passive infrared sensor 144-1 and a second one of the passive infrared sensors 144-2. Zone 3 is the area that is visible only to the second passive infrared sensor 144-2. Zone 4 is the area that is visible only to the second passive infrared sensor 144-2 and a third one of the passive infrared sensors 144-3. Zone 5 is the area that is visible only to the third passive infrared sensor 144-3. In some embodiments, the doorbell 130 may be capable of determining the direction that an object is moving based upon which zones are triggered in a time sequence.

Figure 21:
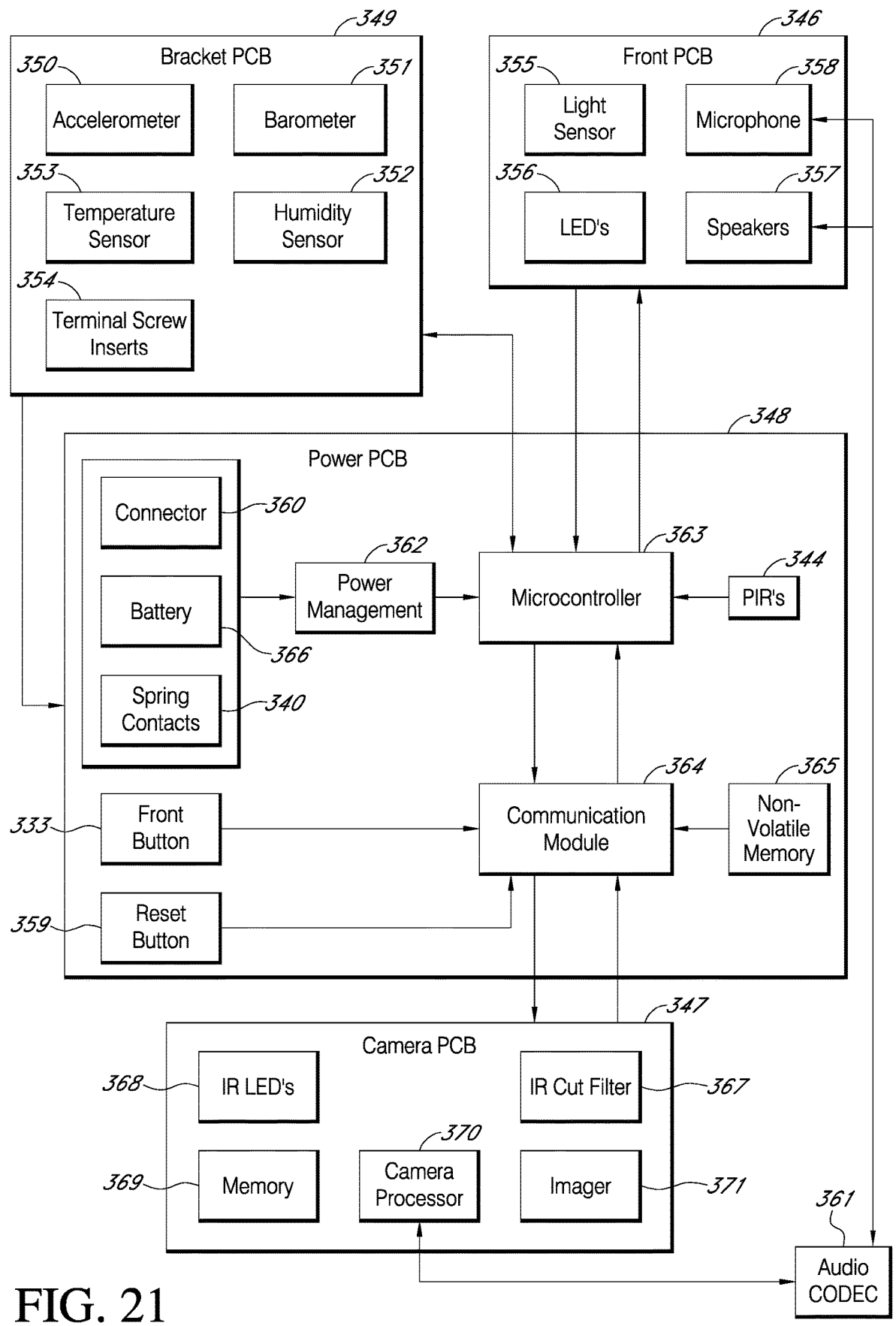
FIG. 21 a functional block diagram of the components of the A/V recording and communication device of FIG. 14.

FIG. 21 is a functional block diagram of the components within or in communication with the doorbell 330, according to an aspect of the present embodiments. As described above, the bracket PCB 349 may comprise an accelerometer 350, a barometer 351, a humidity sensor 352, and a temperature sensor 353. The accelerometer 350 may be one or more sensors capable of sensing motion and/or acceleration. The barometer 351 may be one or more sensors capable of determining the atmospheric pressure of the surrounding environment in which the bracket PCB 349 may be located. The humidity sensor 352 may be one or more sensors capable of determining the amount of moisture present in the atmospheric environment in which the bracket PCB 349 may be located. The temperature sensor 353 may be one or more sensors capable of determining the temperature of the ambient environment in which the bracket PCB 349 may be located. As described above, the bracket PCB 349 may be located outside the housing of the doorbell 330 so as to reduce interference from heat, pressure, moisture, and/or other stimuli generated by the internal components of the doorbell 330.

With further reference to FIG. 21, the bracket PCB 349 may further comprise terminal screw inserts 354, which may be configured to receive the terminal screws 338 and transmit power to the electrical contacts 377 on the mounting bracket 337 (FIG. 17). The bracket PCB 349 may be electrically and/or mechanically coupled to the power PCB 348 through the terminal screws 338, the terminal screw inserts 354, the spring contacts 340, and the electrical contacts 377. The terminal screws 338 may receive electrical wires located at the surface to which the doorbell 330 is mounted, such as the wall of a building, so that the doorbell can receive electrical power from the building's electrical system. Upon the terminal screws 338 being secured within the terminal screw inserts 354, power may be transferred to the bracket PCB 349, and to all of the components associated therewith, including the electrical contacts 377. The electrical contacts 377 may transfer electrical power to the power PCB 348 by mating with the spring contacts 340.

With further reference to FIG. 21, the front PCB 346 may comprise a light sensor 355, one or more light-emitting components, such as LED's 356, one or more speakers 357, and a microphone 358. The light sensor 355 may be one or more sensors capable of detecting the level of ambient light of the surrounding environment in which the doorbell 330 may be located. LED's 356 may be one or more light-emitting diodes capable of producing visible light when supplied with power. The speakers 357 may be any electromechanical device capable of producing sound in response to an electrical signal input. The microphone 358 may be an acoustic-to-electric transducer or sensor capable of converting sound waves into an electrical signal. When activated, the LED's 356 may illuminate the light pipe 336 (FIG. 14). The front PCB 346 and all components thereof may be electrically coupled to the power PCB 348, thereby allowing data and/or power to be transferred to and from the power PCB 348 and the front PCB 346.

The speakers 357 and the microphone 358 may be coupled to the camera processor 370 through an audio CODEC 361. For example, the transfer of digital audio from the user's client device 114 and the speakers 357 and the microphone 358 may be compressed and decompressed using the audio CODEC 361, coupled to the camera processor 370. Once compressed by audio CODEC 361, digital audio data may be sent through the communication module 364 to the network 112, routed by one or more servers 118, and delivered to the user's client device 114. When the user speaks, after being transferred through the network 112, digital audio data is decompressed by audio CODEC 361 and emitted to the visitor via the speakers 357.

With further reference to FIG. 21, the power PCB 348 may comprise a power management module 362, a microcontroller 363 (may also be referred to as "processor," "CPU," or "controller"), the communication module 364, and power PCB non-volatile memory 365. In certain embodiments, the power management module 362 may comprise an integrated circuit capable of arbitrating between multiple voltage rails, thereby selecting the source of power for the doorbell 330. The battery 366, the spring contacts 340, and/or the connector 360 may each provide power to the power management module 362. The power management module 362 may have separate power rails dedicated to the battery 366, the spring contacts 340, and the connector 360. In one aspect of the present disclosure, the power management module 362 may continuously draw power from the battery 366 to power the doorbell 330, while at the same time routing power from the spring contacts 340 and/or the connector 360 to the battery 366, thereby allowing the battery 366 to maintain a substantially constant level of charge. Alternatively, the power management module 362 may continuously draw power from the spring contacts 340 and/or the connector 360 to power the doorbell 330, while only drawing from the battery 366 when the power from the spring contacts 340 and/or the connector 360 is low or insufficient. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360. The power management module 362 may also serve as a conduit for data between the connector 360 and the microcontroller 363. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360.

With further reference to FIG. 21, in certain embodiments the microcontroller 363 may comprise an integrated circuit including a processor core, memory, and programmable input/output peripherals. The microcontroller 363 may receive input signals, such as data and/or power, from the PIR sensors 344, the bracket PCB 349, the power management module 362, the light sensor 355, the microphone 358, and/or the communication module 364, and may perform various functions as further described below. When the microcontroller 363 is triggered by the PIR sensors 344, the microcontroller 363 may be triggered to perform one or more functions. When the light sensor 355 detects a low level of ambient light, the light sensor 355 may trigger the microcontroller 363 to enable "night vision," as further described below. The microcontroller 363 may also act as a conduit for data communicated between various components and the communication module 364.

With further reference to FIG. 21, the communication module 364 may comprise an integrated circuit including a processor core, memory, and programmable input/output peripherals. The communication module 364 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 364 may receive inputs, such as power and/or data, from the camera PCB 347, the microcontroller 363, the button 333, the reset button 359, and/or the power PCB non-volatile memory 365. When the button 333 is pressed, the communication module 364 may be triggered to perform one or more functions. When the reset button 359 is pressed, the communication module 364 may be triggered to erase any data stored at the power PCB non-volatile memory 365 and/or at the camera PCB memory 369. The communication module 364 may also act as a conduit for data communicated between various components and the microcontroller 363. The power PCB non-volatile memory 365 may comprise flash memory configured to store and/or transmit data. For example, in certain embodiments the power PCB non-volatile memory 365 may comprise serial peripheral interface (SPI) flash memory.

With further reference to FIG. 21, the camera PCB 347 may comprise components that facilitate the operation of the camera 334. For example, an imager 371 may comprise a video recording sensor and/or a camera chip. In one aspect of the present disclosure, the imager 371 may comprise a complementary metal-oxide semiconductor (CMOS) array, and may be capable of recording high definition (e.g., 720p or better) video files. A camera processor 370 may comprise an encoding and compression chip. In some embodiments, the camera processor 370 may comprise a bridge processor. The camera processor 370 may process video recorded by the imager 371 and audio recorded by the microphone 358, and may transform this data into a form suitable for wireless transfer by the communication module 364 to a network. The camera PCB memory 369 may comprise volatile memory that may be used when data is being buffered or encoded by the camera processor 370. For example, in certain embodiments the camera PCB memory 369 may comprise synchronous dynamic random access memory (SD RAM). IR LED's 368 may comprise light-emitting diodes capable of radiating infrared light. IR cut filter 367 may comprise a system that, when triggered, configures the imager 371 to see primarily infrared light as opposed to visible light. When the light sensor 355 detects a low level of ambient light (which may comprise a level that impedes the performance of the imager 371 in the visible spectrum), the IR LED's 368 may shine infrared light through the doorbell 330 enclosure out to the environment, and the IR cut filter 367 may enable the imager 371 to see this infrared light as it is reflected or refracted off of objects within the field of view of the doorbell. This process may provide the doorbell 330 with the "night vision" function mentioned above.

One aspect of the present embodiments includes the realization that in current audio/video (A/V) recording and communication devices (e.g., doorbells) other than the present embodiments, automatic exposure controls cannot handle multi-exposure image conditions. For example, if a field of view of a camera includes a darker region and a brighter region, exposure controls cannot handle more than one part of the scene or simply the average luminance of the entire scene. With A/V recording and communication devices, multi-exposure image conditions may be a particular problem as many A/V recording and communication devices are placed at a structure's entrance that may be covered, requiring the A/V recording and communication device to capture image data of a region shaded by the covering (i.e. darker region) and a region beyond the covering (i.e. brighter region). In another scenario, the A/V recording and communication device may be positioned near an external light source, such as a porchlight, which can create relatively bright areas and relatively dark areas. In these types of lighting conditions, if exposure range is simply increased, the darker region(s) may become brighter but the brighter region(s) may become saturated and washed out reducing image quality. On the other hand, if exposure range is simply decreased, the brighter region(s) may become darker but the darker region(s) may become even darker reducing image quality. Further, in current A/V recording and communication devices other than the present embodiments, default exposure controls tend to focus on a center region of the field of view, usually setting exposure controls for bright daylight and focusing less on the boundary areas of a scene. However, it may be more important for A/V recording and communication devices to set exposure controls to capture higher quality image data of a particular person or object than of the entire scene. The present embodiments solve these problems by applying exposure settings based on motion detection and scene conditions. In some embodiments, the A/V recording and communication device may detect a foreground object, determine an external lighting level associated with the foreground object, and apply at least one exposure control gain setting to configure a camera to capture image data focused on the foreground object. In some embodiments, the A/V recording and communication device may detect a multi-exposure condition and apply at least one DR setting to configure the camera to capture image data corrected for the multi-exposure image condition. These and other aspects and advantages of the present embodiments are described in further detail below.

Figure 22:
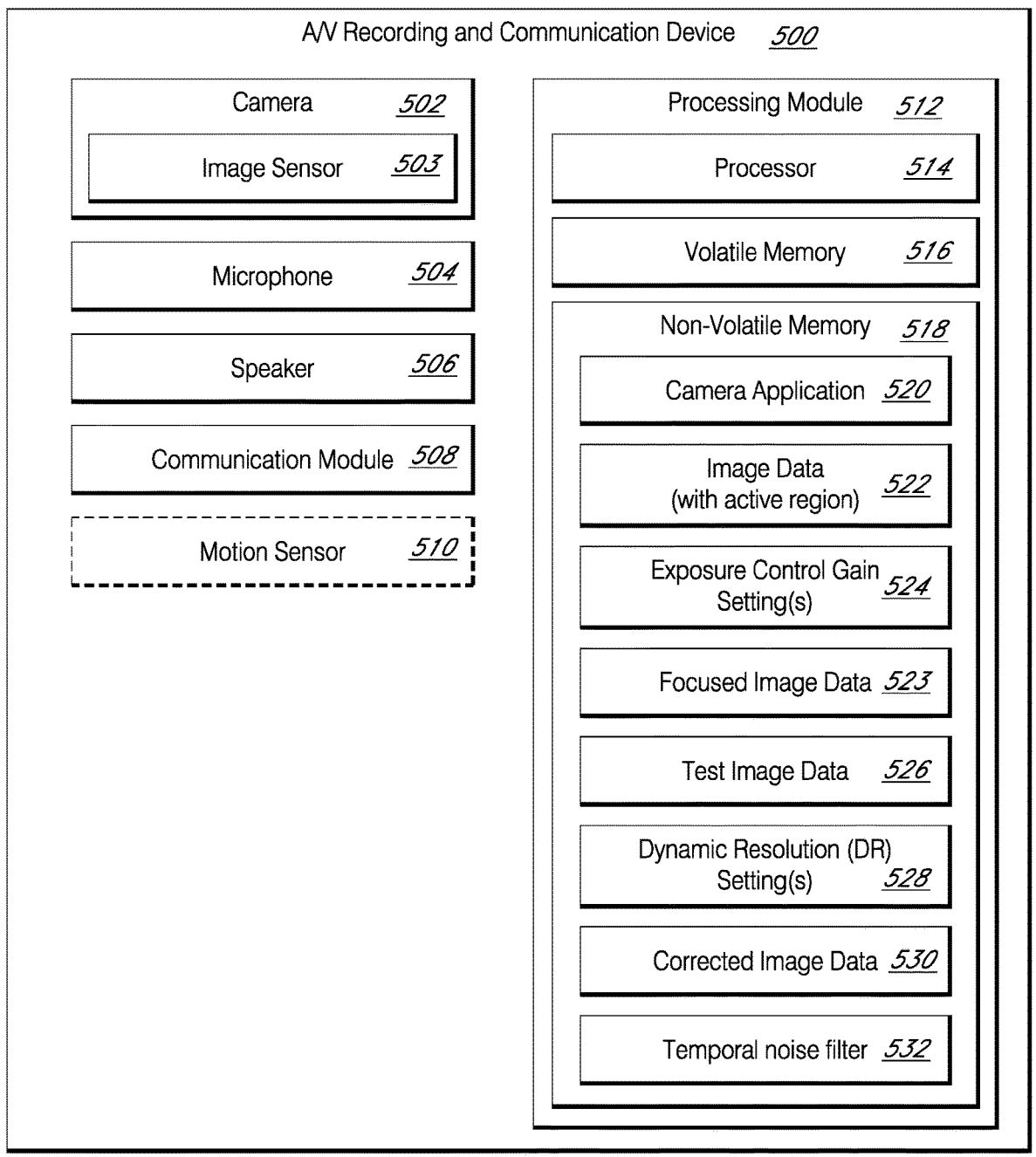
FIG. 22 is a functional block diagram illustrating one embodiment of an A/V recording and communication device according to various aspects of the present disclosure.

FIG. 22 is a functional block diagram illustrating one embodiment of an A/V recording and communication device 500 according to various aspects of the present disclosure. In some embodiments, the A/V recording and communication device 500 may be used with the system illustrated in FIG. 1. For example, the A/V recording and communication device 500 may take the place of the A/V recording and communication doorbell 100, or may be used in conjunction with the A/V recording and communication doorbell 100.

With reference to FIG. 22, the A/V recording and communication device 500 may comprise a processing module 512 that is operatively connected to a camera 502, a microphone 504, a speaker 506, and a communication module 508. In various embodiments, the camera 502 may include a digital image sensor 503 that detects and conveys image data by converting variable attenuation of light waves passing through and/or reflecting off objects into digital data in a manner well known in the art. In some embodiments, the processing module 512 may also be operatively connected to a motion sensor 510 such as (but not limited to) the PIR sensors 344, as described above. Further, in alternative embodiments, the A/V recording and communication device 500 may comprise one or more motion sensors 510 either in place of or in addition to motion sensors such as the PIR sensors 344. The processing module 512 may comprise a processor 514, volatile memory 516, and non-volatile memory 518 that includes a camera application 520. In some embodiments, the camera application 520 may configure the processor 514 to capture image data 522 with an active region and to determine and apply at least one exposure control gain setting 524 to configure the camera 502 to capture image data 523 focused on a foreground object within the active region, as further described below. In further embodiments, the camera application 520 may configure the processor 514 to capture test image data 526 having a multi-exposure image condition and to apply at least one dynamic resolution (DR) setting 528 to configure the camera 502 to capture image data 530 corrected for the multi-exposure image condition, as further described below. In some embodiments, the camera application 520 may also configure the processor 514 to apply a temporal noise filter 532 to reduce background noise of corrected image data 530, as further described below. In various embodiments, the image data 522, exposure control gain setting(s) 524, focused image data 523, test image data 526, DR setting(s) 528, corrected image data 530, and the temporal noise filter 532 may be stored in the non-volatile memory 518.

With further reference to FIG. 22, the image data 522, 523, 526, 530 may comprise image sensor data such as (but not limited to) exposure values and data regarding pixel values for a particular sized frame. For example, a 1920× 1080 frame has 1920 rows and 1080 columns with a pixel located at each intersection of a row and column. Further, each pixel may have numerical values that correspond to color or chroma component (such as Cb, Cr) and a luma or brightness component (Y). Although different methods of pixel valuations exist, YCbCr is a widely used color space coding scheme. Further, image data may comprise converted image sensor data for standard image file formats such as (but not limited to) JPEG, JPEG 2000, TIFF, BMP, or PNG. In addition, image data may also comprise data related to video, where such data may include (but is not limited to) image sequences, frame rates, and the like. Moreover, image data may include data that is analog, digital, uncompressed, compressed, and/or in vector formats. Image data may take on various forms and formats as appropriate to the requirements of a specific application in accordance with the present embodiments. As described herein, the term "record" may also be referred to as "capture" as appropriate to the requirements of a specific application in accordance with the present embodiments.

In further reference to FIG. 22, the A/V recording and communication device 500 may assess scene conditions and automatically adjust camera 502 settings such as (but not limited to) exposure time, iris/lens aperture, focus, image sensor gain, and various filters. For example, the camera 502 may be configured to capture image data with the active region 522 and/or test image data 526 to automatically adjust settings through processes that analyze these measurements and decide on optimal settings, as further described below. In particular, such processes may provide settings and configurations to overcome multi-exposure image conditions, as further described below.

In further reference to FIG. 22, the communication module 508, may comprise (but is not limited to) one or more transceivers and/or wireless antennas (not shown) configured to transmit and receive wireless signals. In further embodiments, the communication module 508 may comprise (but is not limited to) one or more transceivers configured to transmit and receive wired and/or wireless signals. In addition, the A/V recording and communication device 500 may be similar in structure and/or function to the A/V recording and communication doorbell 130 (FIGS. 3-13) or the A/V recording and communication doorbell 330 (FIGS. 14-21). For example, the A/V recording and communication device 500 may include a camera similar (or identical) in structure and/or function to the camera 154 of the A/V recording and communication doorbell 130 or a camera similar (or identical) in structure and/or function to camera 334 of the A/V recording and communication doorbell 330.

In the illustrated embodiment of FIG. 22, the various components including (but not limited to) the processing module 512 and the communication module 508 are represented by separate boxes. The graphical representations depicted in FIG. 22 are, however, merely examples, and are not intended to indicate that any of the various components of the A/V recording and communication device 500, are necessarily physically separate from one another, although in some embodiments they might be. In other embodiments, however, the structure and/or functionality of any or all of the components of the A/V recording and communication device 500 may be combined. For example, in some embodiments the communication module 508 and/or the camera 502 may include its own processor, volatile memory, and/or non-volatile memory.

Figure 23:
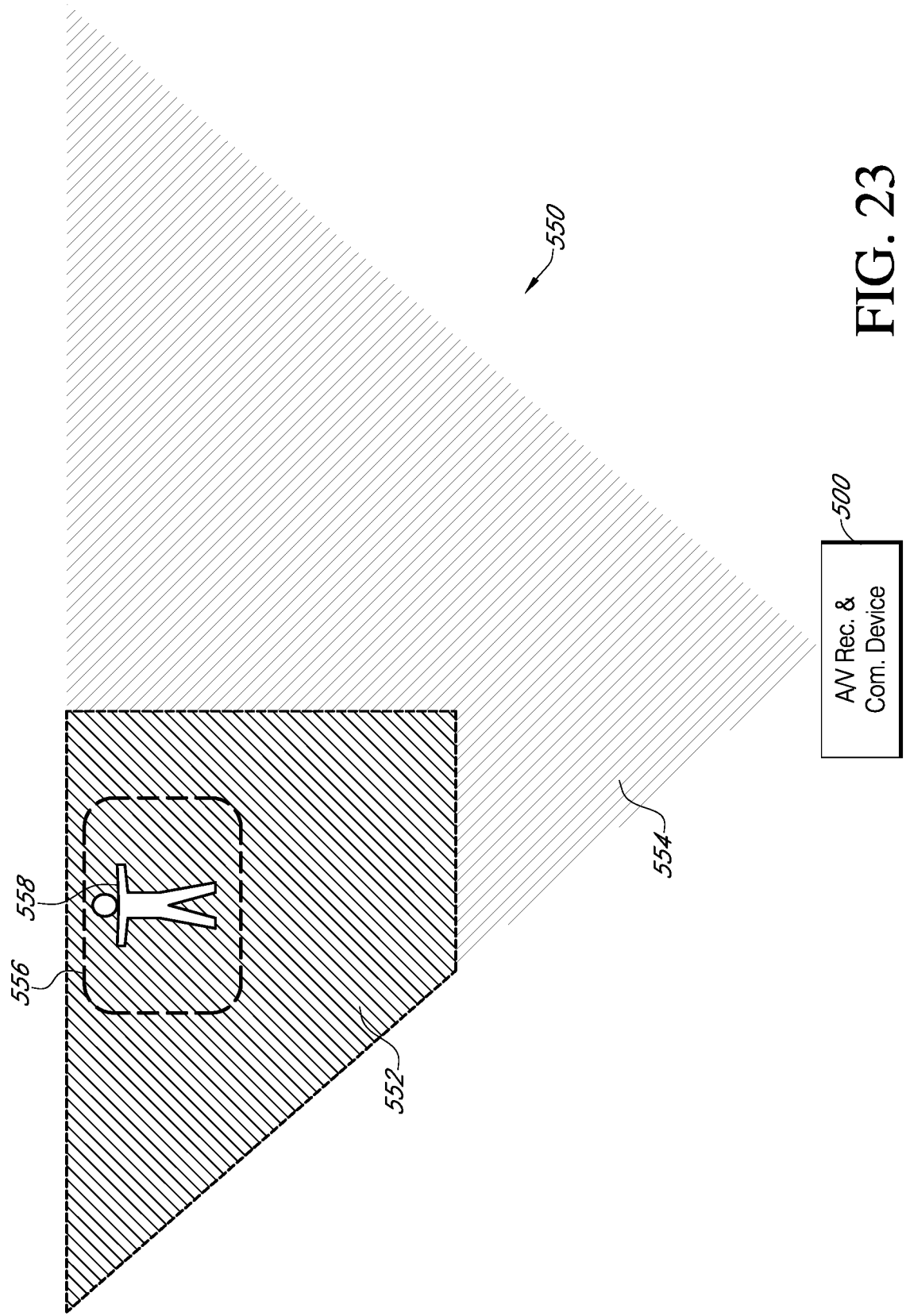
FIG. 23 is a diagram illustrating an A/V recording and communication device having a field of view with an external lighting level associated with a foreground object according to various aspects of the present disclosure.

FIG. 23 is a diagram illustrating an A/V recording and communication device 500 having a field of view 550 with an external lighting level 552 associated with a foreground object 558 according to various aspects of the present disclosure. In some embodiments, the camera 502 may have a field of view 550 that includes multi-exposure image conditions such as (but not limited to) where portions of the field of view 550 have differing external lighting levels. For example, the field of view 550 may include a relatively darker portion 552 and a relatively lighter portion 554. In some embodiments, the camera application 520 may configure the processor 514 to capture image data 522 of the field of view 550, where the field of view 550 includes the active image region 556. In addition, the A/V recording and communication device 500 may detect motion within the field of view 550 using the motion sensor 510 and/or the camera 502 and determine the active image region 556 based on a location of the foreground object 558 that caused the motion detection, as further described below. In various embodiments, the camera application 520 may configure the processor 514 to determine an external lighting level associated with the foreground object 558 and apply at least one exposure control gain setting 524 to capture image data 523 focused on the foreground object 558, as further described below. Although a specific field of view having a relatively darker portion 552 and a relatively lighter portion 554 are illustrated in FIG. 23, any of a variety of fields of view including various multi-exposure image conditions may exist depending on a variety of factors including (but not limited to) the time of day, weather conditions, structures, and/or placement of the A/V recording and communication device 500, such as, for example, near porchlights, streetlights, etc. Processes for detecting multi-exposure image conditions and applying settings to the camera 502 to capture higher quality image data are described in further detail below.

Figure 24:
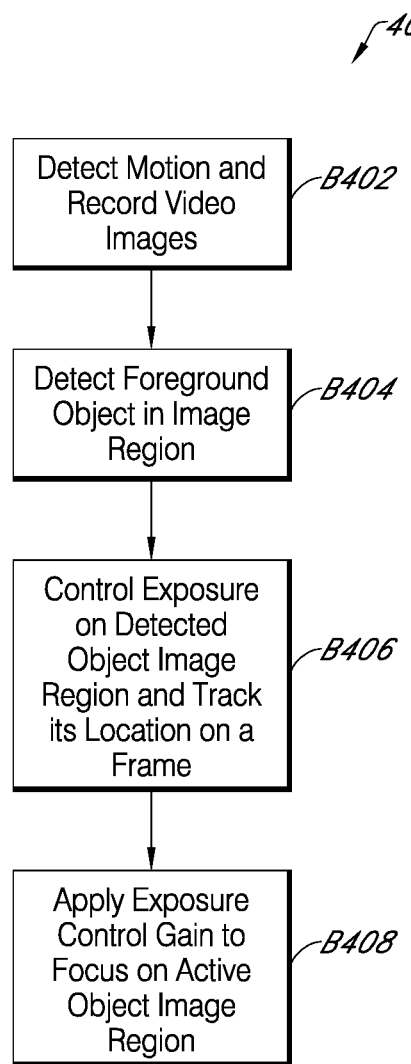
FIG. 24 is a flowchart illustrating an embodiment of a process for capturing image data focused on a foreground object according to various aspects of the present disclosure.

FIG. 24 is a flowchart illustrating an embodiment of a process 400 for capturing image data focused on a foreground object according to various aspects of the present disclosure. The process 400 may include detecting (block B402) motion and recording (block B402) video images 522 from the field of view 550 including the active image region 556 using the camera 502. In various embodiments, the motion is caused by one or more objects that are moving within the field of view 550 and the motion may be detected (block B402) using the motion sensor 510 and/or the camera 502. As described above, motion sensor(s) may include (but are not limited to) PIR sensors 344 that are capable of detecting and communicating the presence of a heat source within the field of view 550. Further, alternative embodiments may comprise one or more motion sensors 510 either in place of or in addition to the PIR sensors 344. The motion sensors may be configured to detect motion using any methodology, such as a methodology that does not rely on detecting the presence of a heat source within the field of view 550. In alternative embodiments, motion may be detected (block B402) by analyzing the image data 522 for changes in pixel values between frames captured of the field of view 550 using the camera 502.

In reference to FIG. 24, the process 400 may also include detecting (block B404) the foreground object 558 within the active image region 556. In various embodiments, the detected foreground object 558 may have caused the motion detection (block B402). The process may further include controlling (block B406) exposure on the foreground object 558 in the active image region 556. In some embodiments, the process 400 may control (block B406) exposure on the foreground object 558 by determining an external lighting level associated with the foreground object 558 using the video images 522 (may also be referred to as image data 522) recorded using the camera 502. The external lighting level associated with the foreground object 558 may depend on the multi-exposure image condition portion 552, 554 of the field of view 550 that the active region 556 may be found within. In various embodiments, the process 400 may further control (block B406) exposure on the foreground object 558 by determining at least one exposure control gain setting 524 based on the determined external lighting level. In some embodiments, the at least one exposure control gain setting 524 may be determined by comparing the determined external lighting level associated with the foreground object 558 and a predetermined range of external lighting levels. In some embodiments, the predetermined range of external lighting levels may be between a frame average value of about 100 and a frame average value of about 140, such as a frame average value of about 120. In addition, the at least one exposure control gain setting 524 may include (but not be limited to) an aperture setting, shutter speed setting, and/or Internal Organization of Standardization (ISO) setting for the camera 502.

In further reference to FIG. 24, in addition to controlling (block B406) exposure, the process 400 may also include tracking (block B406) the foreground object 558 within the field of view 550 of the camera 502. In some embodiments, the foreground object 558 may move into a different multi-exposure image condition portion 552, 554 of the field of view 550, and thus the external lighting level associated with the foreground object 558 may change. Thus, by tracking (block B406) the foreground object 558, the process 400 may recalibrate the controlling (block B406) of exposure on the foreground object 558 as appropriate to the external lighting level in accordance with embodiments of the present disclosure. The process 400 may also include applying (block B408) the at least one exposure control gain setting 524 to configure the camera 502 to capture image data 523 focused on the foreground object 558. In some embodiments, the focused image data 523 may include at least one frame that includes the foreground object 558 in a higher image quality than found in the image data 522 captured using the camera 502 before applying (block B408) the at least one exposure control gain setting 524.

Figure 25:
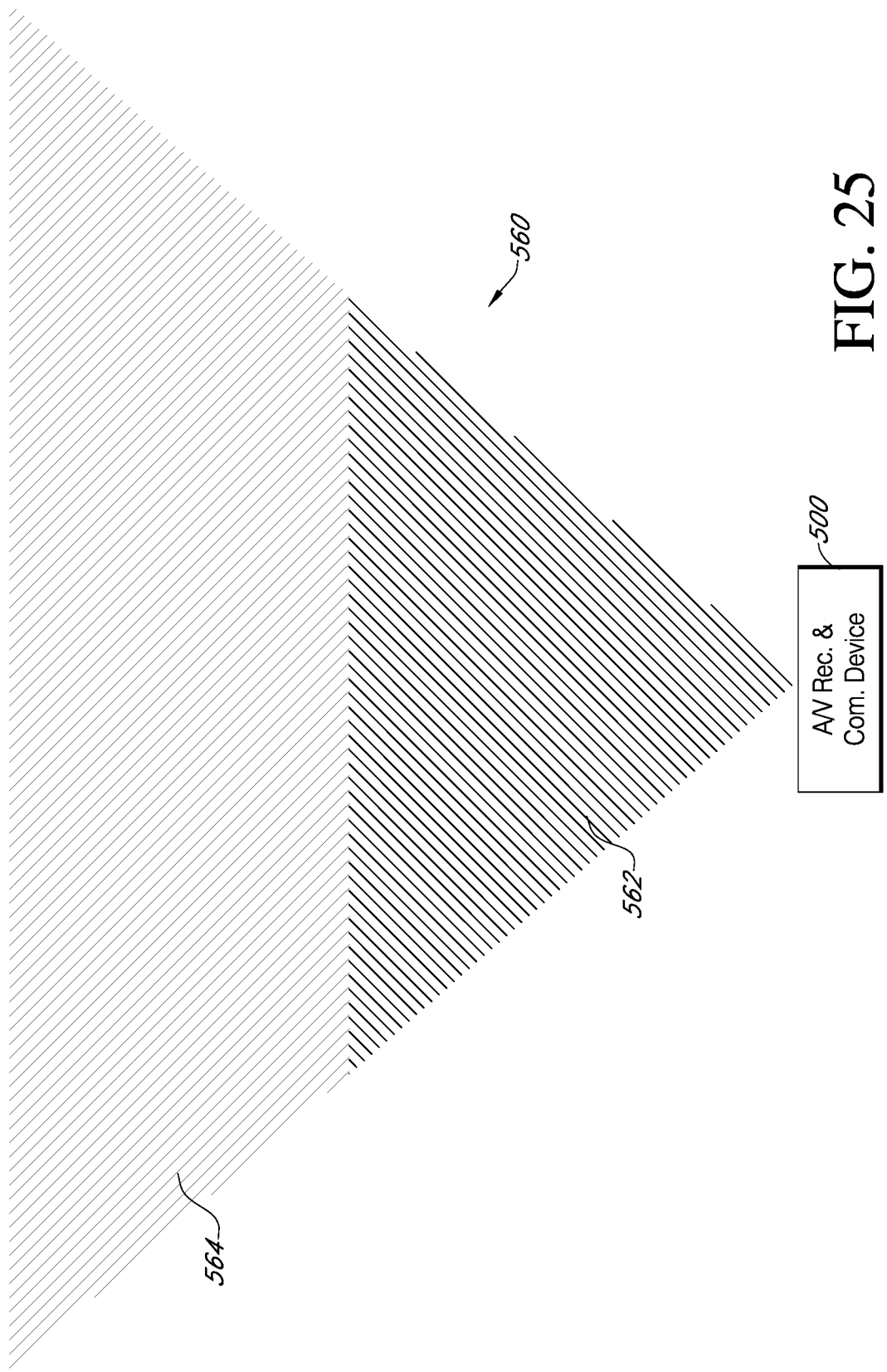
FIGS. 25 and 26 are diagrams illustrating an A/V recording and communication device having a field of view with different multi-exposure image conditions according to various aspects of the present disclosure.
Figure 26:
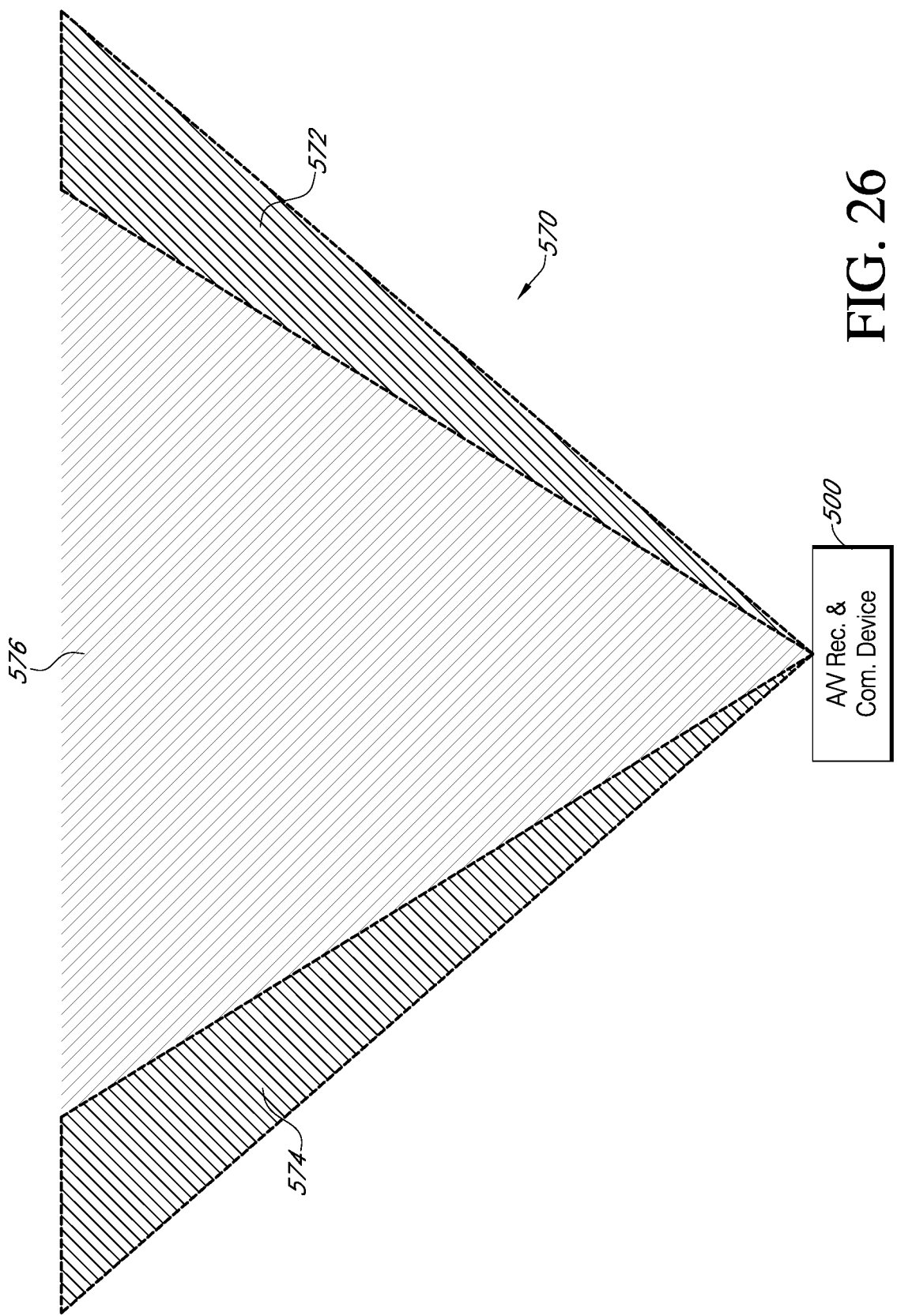

FIGS. 25 and 26 are diagrams illustrating the A/V recording and communication device 500 having fields of view with example multi-exposure image conditions according to various aspects of the present disclosure. In reference to FIG. 25, in some embodiments, the A/V recording and communication device 500 may have a field of view 560 with a portion 562 that is darker than another portion 564. For example, if the A/V recording and communication device 500 may be placed within a covered porch area (i.e. the darker portion 562) and is aimed beyond the porch area to an area that is exposed to direct sunlight or a streetlight (i.e. the brighter portion 564). Such a multi-exposure image condition may result in image data of lower quality where the dark porch is too dark and/or the brighter portion is too bright. Another example multi-exposure image condition is illustrated in FIG. 26. In reference to FIG. 26, the A/V recording and communication device 500 may have a field of view 570 with portions 572, 574 that are darker than a brighter portion 576. Here, the brighter portion 576 is directly in front of the A/V recording and communication device 500, whereas the darker portions 572, 574 are on the edges of the field of view 570 of the camera 502. As discussed above, the present embodiments solve the problem of A/V recording and communication devices', other than the present embodiments, inability to handle multi-exposure image conditions. Processes for applying at least one DR setting to configure the camera 502 to capture corrected image data 530 for multi-exposure image conditions are described in further detail below.

Figure 27:
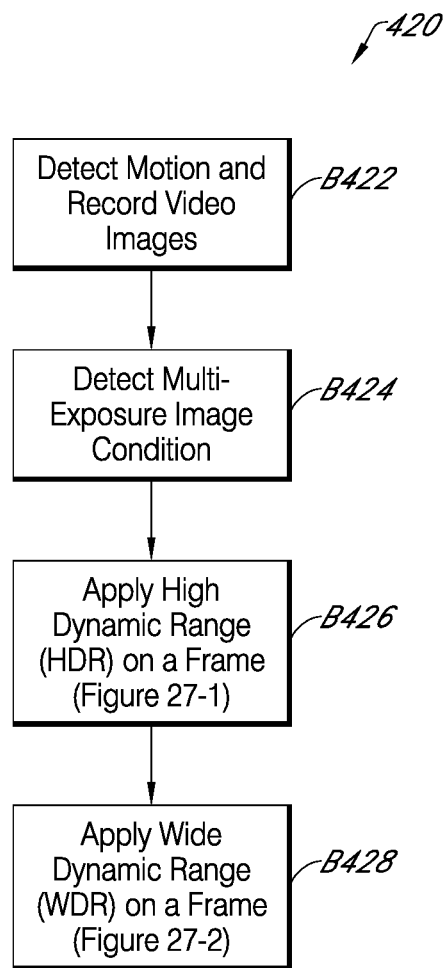
Figures 1, 27:
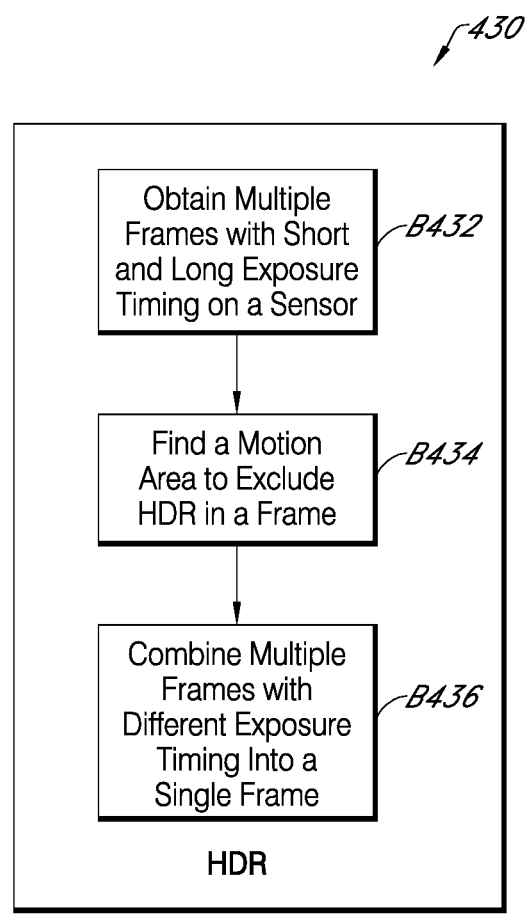
Figures 2, 27:
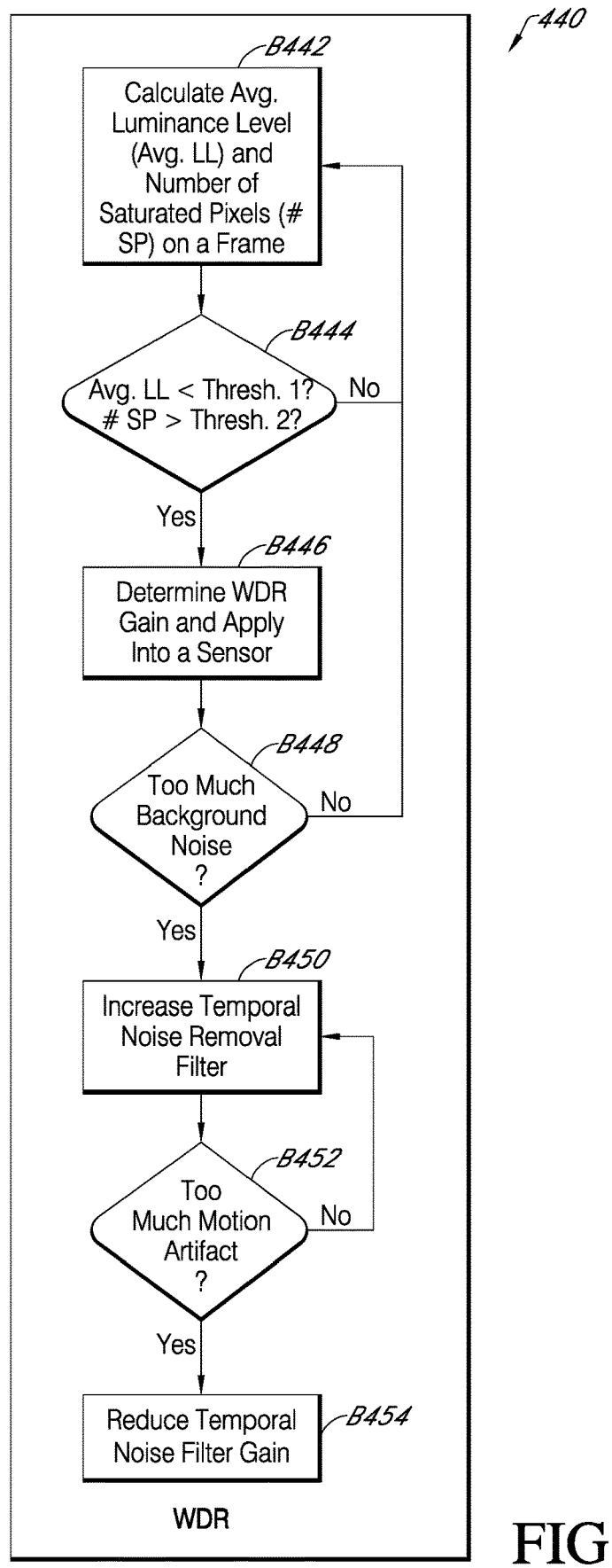

FIGS. 27, 27-1, and 27-2 are flowcharts illustrating an embodiment of a process for capturing image data 530 corrected for a multi-exposure image condition according to various aspects of the present disclosure. In reference to FIG. 27, the process 420 may include detecting (block B422) motion and recording (block B422) video images of a field of view 560, 570 using the camera 502. In some embodiments, the recorded (block B422) video images may be a test image data 526 (FIG. 22) of the field of view 560, 570. As described above, the motion may be caused by one or more objects moving within the field of view 560, 570 and may be detected (block B422) using the motion sensor 510 and/or the camera 502. The process 420 may also include detecting (block B424) a multi-exposure image condition in the field of view 560, 570 of the camera 502. For example, in the field of view 560 of FIG. 25, the dark portion 562 and the bright portion 564 create a multi-exposure image condition. Likewise, in the field of view 570 of FIG. 26, the dark portions 572, 574 and the bright portion 576 create a multi-exposure image condition. In some embodiments, the multi-exposure image condition may be detected (block B424) by analyzing the test image data 526 for changes in pixel values such as (but not limited to) a Y-value associated brightness within a test frame of the test image data 526 captured of the field of view 560, 570 using the camera 502. In other embodiments, the multi-exposure image condition may be detected (block B424) by selecting the test frame from the test image data 526 and determining a pixel distribution value associated with the test frame.

In further reference to FIG. 27, the process 420 may also include applying (block B426 and block B428) at least one DR setting 528 (FIG. 22) to configure the camera 502 to capture corrected image data 530 corrected for the multi-exposure image condition. The process 420 may include applying at least one DR setting 528 by applying (block B426) high dynamic range (HDR) on a frame as illustrated in FIG. 27-1 and further described below. The process 420 may also include applying at least one DR setting 528 by applying (block B428) wide dynamic range (WDR) on a frame as illustrated in FIG. 27-2 and further described below. In various embodiments, the process 420 may apply (block B426 and block B428) the at least one DR setting 528 if the pixel distribution value associated with the test frame is less than a predetermined pixel distribution threshold. In some embodiments, the predetermined pixel distribution threshold may be between a frame average value of about 10 and a frame average value of about 50, such as a frame average value of about 30.

In reference to FIG. 27-1, applying (block B426) HDR on a frame may include a process 430 that includes obtaining (block B432) image data having multiple frames with a short and long exposure timing on an image sensor 503 of the camera 502. For example, the at least one DR setting 528 may configure the camera 502 to capture (block B432) image data having a first frame with a first exposure range and a second frame with a second exposure range, where the second exposure range does not overlap with the first exposure range. In various embodiments, the camera application 520 may configure the processor 514 to combine (block B436) the first frame with the first exposure range and the second frame with the second exposure range to generate a single HDR frame (may also be referred to as corrected image data 530). In some embodiments, the process 430 may also include finding (block B434) a motion area to exclude in the single HDR frame. For example, the camera application 520 may configure the processor 514 to select (block B434) a corresponding motion area in the first frame and the second frame to exclude when generating (block B436) the single HDR frame.

In reference to FIG. 27-2, applying (block B428) WDR on a frame may include capturing image data having a reference frame with a single exposure range and performing the process 440. In various embodiments, the process 440 may include calculating (block B442) an average luminance level and a saturated pixel count corresponding to a number of saturated pixels associated with the reference frame. The process 440 may also include determining (block B444) if the average luminance level is less than a predetermined luminance threshold and the saturated pixel count is more than a predetermined saturated pixels threshold. In some embodiments, the predetermined luminance threshold may be between about 80 and about 100, such as about 90. In some embodiments, the predetermined saturated pixels threshold may be more than about 3% of the total number of pixels, such as more than about 5% of the total number of pixels. If the average luminance level is not less than the predetermined luminance threshold and the saturated pixel count is not more than the predetermined saturated pixels threshold, then the process 440 may return to calculating (block B442) an average luminance level and a saturated pixel count corresponding to a number of saturated pixels associated with the next reference frame. However, if the average luminance level is less than the predetermined luminance threshold and the saturated pixel count is more than the predetermined saturated pixels threshold, then the process 440 may include determining (block B446) a WDR gain setting and applying (block B446) the WDR gain setting on an image sensor 503 of the camera 502.

In further reference to FIG. 27-2, applying (block B446) the WDR gain setting may configure the camera 502 to capture WDR image data (may also be referred to as corrected image data 530). In some embodiments, the process 440 may include determining (block B448) whether a background noise level associated with the WDR image data 530 is above a predetermined noise threshold. If the background noise level is not above the predetermined noise threshold, then the process 440 may return to calculating (block B442) an average luminance level and a saturated pixel count corresponding to a number of saturated pixels associated with the next reference frame. However, if the background noise level is above the predetermined noise threshold, then the process 440 may include applying and/or increasing (block B450) a temporal noise removal filter 532 applied to the WDR image 530. The process 440 may also include determining (block B452) whether the WDR image data 530 has a motion artifact level above a predetermined artifact threshold. If the WDR image data 530 has a motion artifact level above the predetermined artifact threshold, then the process 440 may include reducing (block B454) the temporal noise filter gain strength. However, if the WDR image data 530 has a motion artifact level below (or equal to) the predetermined artifact threshold, then the process 440 may include increasing (block B450) the temporal noise filter gain strength.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130, but without the front button 148, the button actuator 228, and/or the light pipe 232.

Figure 28:
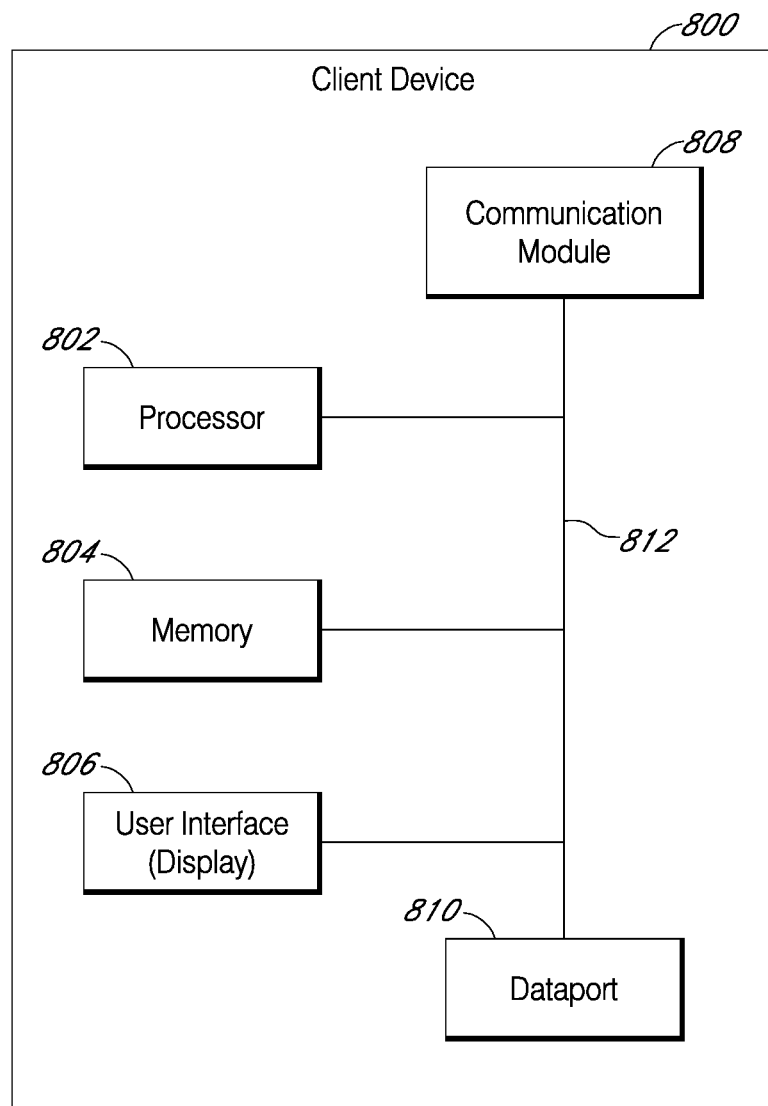
FIG. 28 is a functional block diagram of a client device on which the present embodiments may be implemented according to various aspects of the present disclosure.

FIG. 28 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 28, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 29:
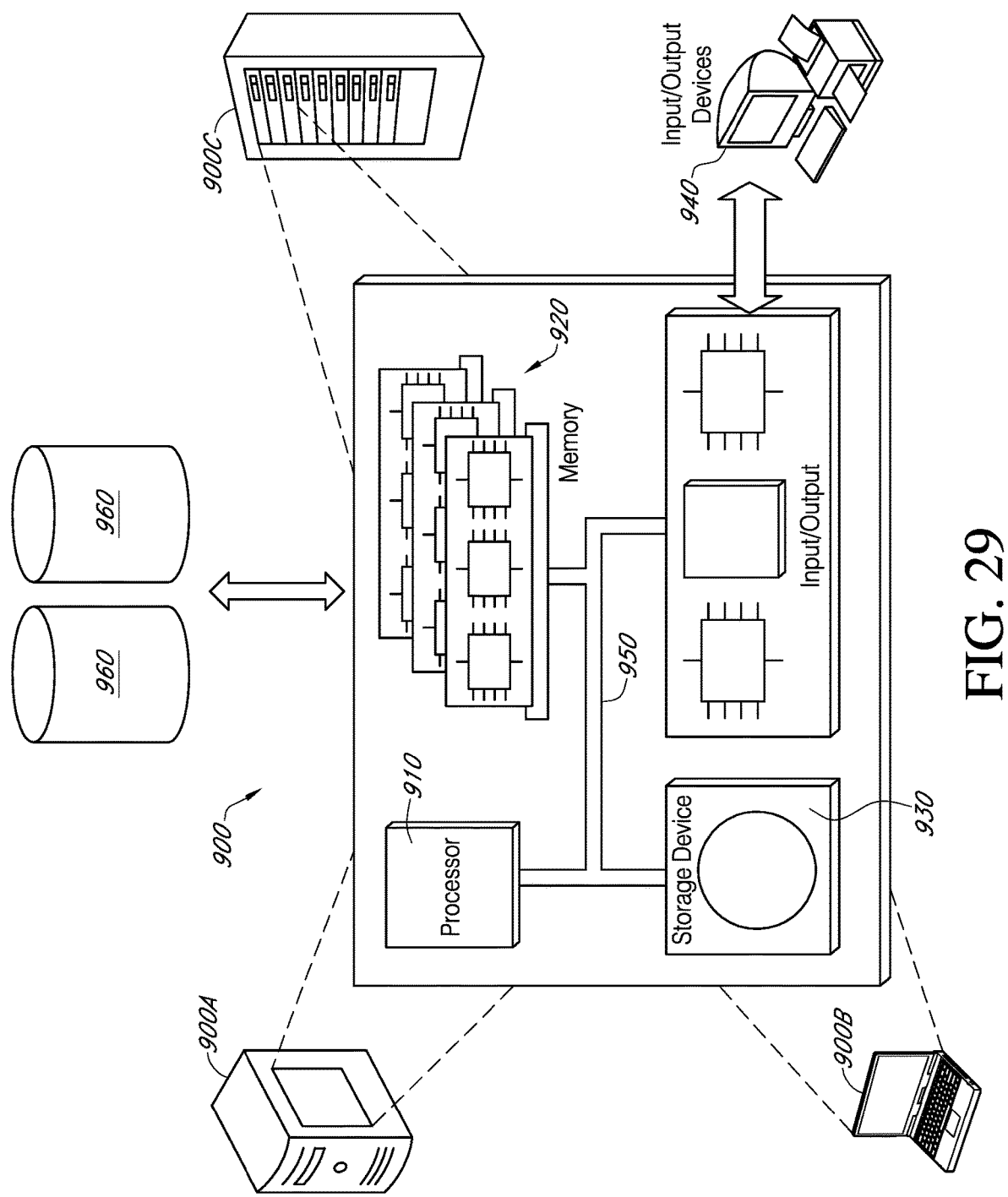
FIG. 29 is a functional block diagram of a general-purpose computing system on which the present embodiments may be implemented according to various aspects of present disclosure.

FIG. 29 is a functional block diagram of a general-purpose computing system on which the present embodiments may be implemented according to various aspects of present disclosure. The computer system 900 may execute at least some of the operations described above. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. An audio/video recording and communication device (A/V device), comprising:
    a camera configured to capture image data of a foreground object within a field of view of the camera, wherein the field of view includes a multi-exposure image condition;
    a communication module;
    a processor operatively connected to the camera and to the communication module; and
    a memory storing a camera application comprising instructions that, when executed by the processor, cause the A/V device to:
        detect motion within the field of view of the camera, wherein the field of view includes an active image region corresponding to a location where the motion was detected;
        capture image data of the field of view, including the active image region, using the camera;
        detect the foreground object in the active image region of the field of view and determine an external lighting level associated with the foreground object in the active image region;
        determine at least one exposure control gain setting based on the external lighting level associated with the foreground object; and
        apply the at least one exposure control gain setting to configure the camera to capture image data focused on the foreground object.

2. The A/V device of claim 1, further comprising a motion sensor configured to detect the motion within the field of view of the camera.

3. The A/V device of claim 1, wherein the camera application comprises further instructions that, when executed by the processor, further cause the A/V device to detect the motion within the field of view of the camera using the camera.

4. The A/V device of claim 1, wherein the camera application comprises further instructions that, when executed by the processor, further cause the A/V device to track the foreground object within the field of view using the camera.

5. The A/V device of claim 1, wherein the camera application comprises further instructions that, when executed by the processor, further cause the A/V device to determine the external lighting level associated with the foreground object using the image data captured using the camera.

6. The A/V device of claim 1, wherein the at least one exposure control gain setting includes an aperture setting.

7. The A/V device of claim 1, wherein the at least one exposure control gain setting includes a shutter speed setting.

8. The A/V device of claim 1, wherein the at least one exposure control gain setting includes an ISO (International Organization of Standardization) setting.

9. The A/V device of claim 1, wherein the camera application comprises further instructions that, when executed by the processor, further cause the A/V device to determine the at least one exposure control gain setting by comparing the external lighting level associated with the foreground object to a predetermined range of external lighting levels.

10. The A/V device of claim 1, wherein the image data focused on the foreground object includes at least one frame that includes the foreground object in a higher image quality than found in the image data captured using the camera before applying the at least one exposure control gain setting.

11. A method for an audio/video recording and communication device (A/V device) comprising a camera, a communication module, and a processing module operatively connected to the camera and to the communication module, the method comprising:
    detecting motion within a field of view of the camera, wherein the field of view includes an active image region corresponding to a location where the motion was detected, and includes a multi-exposure image condition where the field of view includes a first portion having a first external lighting level and a second portion having a second external lighting level;
    capturing image data of the field of view, including the active image region, using the camera;
    detecting a foreground object in the active image region of the field of view and determining an external lighting level associated with the foreground object in the active image region;
    determining at least one exposure control gain setting based on the external lighting level associated with the foreground object; and
    applying the at least one exposure control gain setting to configure the camera to capture image data focused on the foreground object.

12. The method of claim 11, wherein the A/V device further comprises a motion sensor configured to detect the motion within the field of view of the camera.

13. The method of claim 11, further comprising detecting the motion within the field of view of the camera using the camera.

14. The method of claim 11, further comprising tracking the foreground object within the field of view using the camera.

15. The method of claim 11, further comprising determining the external lighting level associated with the foreground object using the image data captured using the camera.

16. The method of claim 11, wherein the at least one exposure control gain setting includes an aperture setting.

17. The method of claim 11, wherein the at least one exposure control gain setting includes a shutter speed setting.

18. The method of claim 11, wherein the at least one exposure control gain setting includes an ISO (International Organization of Standardization) setting.

19. The method of claim 11, further comprising determining the at least one exposure control gain setting by comparing the external lighting level associated with the foreground object to a predetermined range of external lighting levels.

20. The method of claim 11, wherein the image data focused on the foreground object includes at least one frame that includes the foreground object in a higher image quality than found in the image data captured using the camera before applying at least one auto-exposure setting.

* * * * *